US010546511B2

(12) United States Patent
Tsuji et al.

(10) Patent No.: US 10,546,511 B2
(45) Date of Patent: Jan. 28, 2020

(54) SENSOR DATA ANALYSIS SYSTEM AND SENSOR DATA ANALYSIS METHOD

(71) Applicant: HITACHI, LTD., Tokyo (JP)

(72) Inventors: Satomi Tsuji, Tokyo (JP); Kazuo Yano, Tokyo (JP); Nobuo Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 238 days.

(21) Appl. No.: 15/591,330

(22) Filed: May 10, 2017

(65) Prior Publication Data

US 2017/0337842 A1 Nov. 23, 2017

(30) Foreign Application Priority Data

May 20, 2016 (JP) .................. 2016-101241

(51) Int. Cl.
*G09B 19/00* (2006.01)
*G09B 5/02* (2006.01)
*G06F 3/0484* (2013.01)
*G06F 17/18* (2006.01)

(52) U.S. Cl.
CPC .............. *G09B 19/00* (2013.01); *G09B 5/02* (2013.01); *G06F 3/04847* (2013.01); *G06F 17/18* (2013.01)

(58) Field of Classification Search
CPC .................................................... G09B 19/00
USPC ......................................................... 434/236
See application file for complete search history.

(56) References Cited

U.S. PATENT DOCUMENTS

2011/0295655 A1 12/2011 Tsuji et al.

FOREIGN PATENT DOCUMENTS

| JP | 2008-210363 A | 9/2008 |
| JP | 2013-080429 A | 5/2013 |
| WO | 2010/052845 A1 | 5/2010 |

OTHER PUBLICATIONS

Japanese Office Action dated Aug. 20, 2019 for the Japanese Patent Application No. 2016-101241.

*Primary Examiner* — Kesha Frisby
(74) *Attorney, Agent, or Firm* — Volpe and Koenig, P.C.

(57) ABSTRACT

Provided is a sensor data analysis system, comprising terminals, a control unit, an analysis unit, and a storage unit, wherein the terminals worn on persons belonging to an organization, the terminals each comprising a sensor to measure a physical quantity, the storage unit holds an activity index of the organization, and holds, for a first condition relating to a behavior of each of the persons, advice corresponding to a statistical relation between an amount of the behavior satisfying the first condition and the activity index, the control unit generates a behavior index for indicating a behavior of a first person based on the physical quantity, the analysis unit calculates, for the first condition, the statistical relation between the amount of the behavior satisfying the first condition and the activity index based on the behavior index, and the control unit outputs advice corresponding to the statistical relation satisfying a second condition.

15 Claims, 26 Drawing Sheets

BEHAVIOR INDEX TABLE (CSDTA)

| DATE (DTA1) | CONVERSATION ID (DTA2) | SUBJECT PARTY ID (DTA3) | OPPOSITE PARTY ID (DTA4) | TIME SLOT (DTA5) | DURATION (DTA6) | CONVERSATION AREA (DTA7) | NUMBER OF PERSONS (DTA8) | CONVERSATION CHARACTERISTIC (DTA9) |
|---|---|---|---|---|---|---|---|---|
| 2015/10/20 | 1020510 | 2695 | 2696 | BEFORE STARTING TO WORK | 5-15 MINUTES | MEETING ROOM A | UP TO 5 | INTERACTIVE |
| 2015/10/20 | 1020510 | 2695 | 2698 | BEFORE STARTING TO WORK | 5-15 MINUTES | MEETING ROOM A | UP TO 5 | INTERACTIVE |
| 2015/10/20 | 1020510 | 2696 | 2695 | BEFORE STARTING TO WORK | 5-15 MINUTES | MEETING ROOM A | UP TO 5 | INTERACTIVE |
| 2015/10/20 | 1020510 | 2696 | 2698 | BEFORE STARTING TO WORK | 5-15 MINUTES | MEETING ROOM A | UP TO 5 | INTERACTIVE |
| 2015/10/20 | 1020510 | 2698 | 2695 | BEFORE STARTING TO WORK | 5-15 MINUTES | MEETING ROOM A | UP TO 5 | INTERACTIVE |
| 2015/10/20 | 1020510 | 2698 | 2696 | BEFORE STARTING TO WORK | 5-15 MINUTES | MEETING ROOM A | UP TO 5 | INTERACTIVE |
| 2015/10/20 | 1020542 | 2695 | 2696 | MORNING | LESS THAN 5 MINUTES | Null | 2 | LISTENER |
| 2015/10/20 | 1020542 | 2696 | 2695 | MORNING | LESS THAN 5 MINUTES | Null | 2 | SPEAKER |
| 2015/10/20 | 1020683 | 2695 | 266f | MORNING | LESS THAN 5 MINUTES | MEETING ROOM B | 2 | LISTENER |
| 2015/10/20 | 1020683 | 266f | 2695 | MORNING | LESS THAN 5 MINUTES | MEETING ROOM B | 2 | SPEAKER |
| 2015/10/20 | 10201222 | 2696 | 2699 | AFTER FINISHING WORK ON TIME | LESS THAN 5 MINUTES | Null | 2 | INTERACTIVE |
| 2015/10/20 | 10201222 | 2699 | 2696 | AFTER FINISHING WORK ON TIME | LESS THAN 5 MINUTES | Null | 2 | INTERACTIVE |

*FIG. 19*

EVENT TABLE(CSDTI)

| DATE (DTI1) | SUBJECT PARTY ID (DTI2) | NUMBER OF MEETINGS (DTI3) | TEMPERA-TURE (DTI4) | DAY OF LEAVING OFFICE ON TIME (DTI5) | BUSINESS TRIP (DTI6) | DRINKING PARTY (DTI7) | DAY OF WEEK (DTI8) |
|---|---|---|---|---|---|---|---|
| 2015/10/20 | 2695 | 2 | 23°C | 0 | 0 | 0 | MON |
| 2015/10/21 | 2695 | 1 | 20°C | 0 | 1 | 0 | TUE |
| 2015/10/22 | 2695 | 0 | 15°C | 1 | 1 | 1 | WED |
| 2015/10/23 | 2695 | 3 | 18°C | 0 | 0 | 0 | THU |
| 2015/10/24 | 2695 | 1 | 19°C | 0 | 0 | 1 | FRI |
| 2015/10/25 | 2695 | null | null | null | null | null | SAT |
| 2015/10/26 | 2695 | null | null | null | null | null | SUN |
| 2015/10/27 | 2695 | 2 | 17°C | 0 | 0 | 0 | MON |
| 2015/10/28 | 2695 | 0 | 20°C | 0 | 0 | 0 | TUE |
| 2015/10/29 | 2695 | 0 | 22°C | 1 | 1 | 0 | WED |

*FIG. 20*

| DATE (DTAP1) | SUBJECT PARTY ID (DTAP2) | OBJECT VARIABLE (DTAP3) ACTIVITY RATIO | COMPLEX INDEX(DTAP4) | | | | |
|---|---|---|---|---|---|---|---|
| | | | OPPOSITE PARTY ID [2697] × TIME SLOT [BEFORE STARTING TO WORK] | OPPOSITE PARTY ID [2697] × TIME SLOT [MORNING] | ... | DAY OF LEAVING OFFICE ON TIME [1] × DESK WORK × TIME SLOT [MORNING] | DAY OF LEAVING OFFICE ON TIME [1] × DESK WORK × TIME SLOT [AFTERNOON] |
| 2015/10/20 | 2695 | -0.33 | 0.08 | 0.80 | | null | null |
| 2015/10/21 | 2695 | 0.02 | 0.96 | 0.57 | | null | null |
| 2015/10/22 | 2695 | 0.40 | 0.76 | 0.99 | | 0.59 | 0.97 |
| 2015/10/23 | 2695 | -0.26 | 0.03 | 0.58 | | null | null |
| 2015/10/24 | 2695 | 0.20 | 0.20 | 0.06 | | null | null |
| 2015/10/25 | 2695 | -0.50 | 0.24 | 0.45 | | null | null |
| 2015/10/26 | 2695 | 0.37 | 0.59 | 0.03 | | null | null |
| 2015/10/27 | 2695 | -0.36 | 0.14 | 0.63 | | null | null |
| 2015/10/28 | 2695 | -0.07 | 0.88 | 0.51 | | null | null |
| 2015/10/29 | 2695 | -0.30 | 0.57 | 0.83 | | 0.44 | 0.18 |
| 2015/10/30 | 2695 | -0.01 | 0.77 | 0.57 | | null | null |
| 2015/10/31 | 2695 | -0.05 | 0.76 | 0.81 | | null | null |
| 2015/11/1 | 2695 | 0.05 | 0.02 | 0.32 | | null | null |
| 2015/11/2 | 2695 | 0.24 | 0.41 | 0.67 | | null | null |
| 2015/11/3 | 2695 | -0.24 | 0.35 | 0.70 | | null | null |
| 2015/11/4 | 2695 | 0.29 | 0.50 | 0.80 | | null | null |
| 2015/11/5 | 2695 | 0.19 | 0.35 | 0.91 | | 1.00 | 0.46 |

INDIVIDUAL DATA SET(CSDTAP)

FIG. 21

| INDEX PATTERN DEFINITION (CSMP) | | | | | | | | |
|---|---|---|---|---|---|---|---|---|
| COMPLEX INDEX(P10) | | | | INDEX CLASS(P20) | | ADVICE TEXT(P30) | | |
| INDEX A(P11) | | INDEX B(P12) | | PATTERN ID(P21) | TYPE (P22) | CONDITION (POSITIVE OR NEGATIVE OF CORRELATION) (31) | HEADER (P32) | DETAILED TITLE(P33) | DETAILED DESCRIPTION(P34) |
| INDEX NAME | VALUE | INDEX NAME | VALUE | | | | | | |
| OPPO-SITE PARTY ID | ARBI-TRARY | ARBITRARY | | - | CONVER-SATION PARTY | 1 | CONVER-SATION: AA | INCREASE A CONVER-SATION WITH AA. | TIME SLOT: BEFORE STARTING TO WORK, MORNING, AFTERNOON, AFTER FINISHING WORK. CONVERSATION TIME: WITHIN 5 MINUTES, 5-15 MINUTES, 15-30 MINUTES, 30 MINUTES OR MORE. NUMBER OF PERSONS: 2, UP TO 5, 6 OR MORE |
| TIME SLOT | BEFORE STARTING TO WORK | DURATION OF CON-VERSA-TION | LESS THAN 5 MINUTES | A021041 | TIME SLOT | 1 | BEFORE STARTING TO WORK: EXCHANGE GREETINGS | INCREASE GREETINGS BEFORE STARTING TO WORK. | EXCHANGE SHORT GREETINGS WITH MORE PEOPLE BEFORE STARTING TO WORK. |
| TIME SLOT | BEFORE STARTING TO WORK | DURATION OF CON-VERSA-TION | 5-15 MINUTES | A021042 | TIME SLOT | null | null | null | null |
| TIME SLOT | MORNING | NUMBER OF PERSONS IN CON-VER-SATION | 6 OR MORE | A022073 | TIME SLOT | 1 | MORNING: MEETING | HOLD A MEETING IN THE MORNING. | PLAN TO HOLD A MEETING IN THE MORNING, WHICH IS BETTER THAN ANY OTHER TIME OF DAY. YOU MIGHT COME UP WITH A GOOD IDEA WITH CLEAR MIND. |
| ... | | | | | | | | | |

| COMPLEX INDEX (P10) | | | | INDEX CLASS (P20) | | CONDITION (POSITIVE OR NEGATIVE OF CORRELATION) (31) | ADVICE TEXT (P30) | | |
|---|---|---|---|---|---|---|---|---|---|
| INDEX A (P11) | | INDEX B (P12) | | PATTERN ID (P21) | TYPE (P22) | | HEADER (P32) | DETAILED TITLE (P33) | DETAILED DESCRIPTION (P34) |
| INDEX NAME | VALUE | INDEX NAME | VALUE | | | | | | |
| TIME SLOT | AFTERNOON | DURATION OF DESK WORK | LESS THAN 5 MINUTES | B013031 | TIME SLOT | 1 | DESK WORK: INCOMING WORK TO BE DONE FIRST | [AFTERNOON] GET INCOMING WORK DONE FIRST. | IF YOU ARE ASKED FOR A CONSULTATION OR ASKED TO DO AN URGENT TASK, GET IT DONE FIRST. |
| TIME TO COME TO OFFICE | h:MM | - | - | C050101 | TIME DISTRIBUTION | 1 | COME TO OFFICE: AFTER h:MM | COME TO OFFICE AFTER h:MM | COME TO OFFICE WITHOUT HASTE IN THE MORNING. |
| TIME TO COME TO OFFICE | h:MM | - | - | C050101 | TIME DISTRIBUTION | 0 | COME TO OFFICE: BY h:MM | COME TO OFFICE BY h:MM | COME TO OFFICE EARLY IN THE MORNING. |
| TOTAL CONVERSATION TIME | - | - | - | C021001 | TIME DISTRIBUTION | 1 | TIME: INCREASE CONVERSATION | TAKE MORE TIME FOR CONVERSATION | TAKE MORE TIME TO HAVE A CONVERSATION WITH PEOPLE. |
| TOTAL CONVERSATION TIME | - | - | - | C021001 | TIME DISTRIBUTION | 0 | TIME: REDUCE CONVERSATION | TAKE LESS TIME FOR CONVERSATION | TRY TO REDUCE, FOR EXAMPLE, TIME FOR A MEETING. |

INDEX PATTERN DEFINITION (CSMP)

| SUBJECT PARTY ID (MLA1) | OPPOSITE PARTY ID (MLA2) | PRIORITY (MLA3) | POSITIVE CORRELATION (MLA4) | TARGET VALUE (MLA5) | TIME SLOT (MLA6) | | | | ... | NUMBER OF PERSONS (MLAn) | |
|---|---|---|---|---|---|---|---|---|---|---|---|
| | | | | | BEFORE STARTING TO WORK | MORNING | AFTERNOON | AFTER FINISHING WORK ON TIME | | 2 | UP TO 5 | 6 OR MORE |
| 2695 | 269a | 37 | 1 | 7 | | | 1 | | ... | 2 | | |
| 2695 | 2670 | 21 | 1 | 9 | | | | | ... | | | |
| 2695 | 265a | 15 | 1 | 1 | | 1 | | | ... | 1 | | |
| 2695 | 266e | 4 | 1 | 3 | 1 | 1 | | | ... | 1 | | |
| 2695 | 2671 | 2 | 1 | 9 | 1 | | | 1 | ... | | | |
| 2695 | 2699 | 1 | 1 | 2 | | 1 | | | ... | 1 | | |

⟵ ADVICE LIST A (CSML_A)

*FIG. 23A*

ADVICE LIST B (CSML_B)

| SUBJECT PARTY ID (MLB1) | PATTERN ID (MLB2) | TYPE (MLB3) | POSITIVE CORRELATION (MLB4) | PRIORITY (MLB5) | TARGET VALUE (MLB6) | PRIORITY ON DAY OF LEAVING OFFICE ON TIME (MLB7) | PRIORITY ON DAY OF DRINKING PARTY (MLB8) |
|---|---|---|---|---|---|---|---|
| 2695 | A021041 | TIME SLOT | 1 | 54 | 3 | 5 | 24 |
| 2695 | A022071 | TIME SLOT | 1 | 37 | 0 | 10 | 31 |
| 2695 | B013000 | TIME SLOT | 1 | 42 | 0 | 55 | 40 |
| 2695 | B031000 | DESK WORK | 0 | 35 | 1 | 21 | 15 |
| 2695 | C024001 | AWAY | 1 | 54 | 60 | 12 | 30 |
| 2695 | C050101 | TIME TO COME TO OFFICE | 0 | 48 | 8:30 | 35 | 5 |

FIG. 23B

SENSOR DATA ANALYSIS SYSTEM AND SENSOR DATA ANALYSIS METHOD

CLAIM OF PRIORITY

The present application claims priority from Japanese patent application JP2016-101241 filed on May 20, 2016, the content of which is hereby incorporated by reference into this application.

BACKGROUND OF THE INVENTION

This invention relates to a technology for analyzing sensor data and presenting a result of the analysis.

In recent years, big data has attracted attention, and a technology for quantitatively measuring human behaviors including walking and sleeping through use of a wearable sensor has become widespread. Particularly in corporations, there has been an increase in attempts to use the big data for decision making in business administration and management. In a corporation, it is possible to quantitatively analyze behaviors of its employees and customers through utilization of human behavior data. Meanwhile, in a corporate organization, achievements are produced as a result of how a plurality of people have related to each other, and hence a method of enhancing productivity of an individual may differ from a method of enhancing productivity of an entire organization. In view of the foregoing, in JP 2008-210363 A, there is disclosed a technology for identifying individual behaviors relating to indices for an organization by statistical analysis.

SUMMARY OF THE INVENTION

Achievements of the corporate organization are produced as a result of interactions among a plurality of persons, and hence the productivity of the organization may be affected by an indirect factor of which a worker is not aware. For example, a worker may come up with an idea or think positively by talking with a specific colleague, and efficiency of specific work may be enhanced in a specific time slot. However, hitherto, there has been no means for measuring or evaluating a spontaneous behavior, for example, a conversation, performed by office workers during a task and a process of the task, and hence schemes for enhancing the productivity have been made through a concerned party's subjective determination and voluntary efforts. It is necessary for a manager and an administrator to provide an organization environment that makes it easier for the workers to work while spontaneously displaying their abilities, and it is useful to quantitatively analyze who is to do what in what way specifically, and to prompt the worker himself/herself to proactively perform that behavior.

In view of the above-mentioned circumstances, this invention has an object to provide a system for analyzing data measured by a sensor and recommending a behavior pattern for activating a state of an organization to each individual.

As representative exemplary means to solve the above-mentioned problem of this invention, there is provided a sensor data analysis system, including: a plurality of terminals; a control unit; an analysis unit; and a storage unit, in which: the plurality of terminals are each worn on each of a plurality of persons belonging to an organization; the plurality of terminals each including at least one sensor configured to measure a physical quantity; the storage unit is configured to: hold an index relating to an activated state of the organization; and hold, for each of a plurality of first conditions relating to a behavior of each of the plurality of persons, a piece of advice corresponding to a statistical relation between an amount of the behavior satisfying the each of the plurality of first conditions and the index relating to the activated state of the organization; the control unit is configured to generate a behavior index for indicating a behavior of a first person among the plurality of persons based on the physical quantity measured by the at least one sensor of one of the plurality of terminals worn on the first person; the analysis unit is configured to calculate, for each of the plurality of first conditions, the statistical relation between the amount of the behavior satisfying the each of the plurality of first conditions and the index relating to the activated state of the organization based on the behavior index; and the control unit is configured to output a piece of advice corresponding to the statistical relation satisfying a second condition.

According to this invention, it is possible to analyze data measured by the sensor, recommend a behavior pattern for activating the state of an organization to each individual, and promote performance of the behavior pattern. Objects, configurations, and effects other than those described above will become apparent in the following description of an embodiment of this invention.

BRIEF DESCRIPTIONS OF THE DRAWINGS

FIG. 19 is an explanatory diagram for showing an example of a format of a behavior index table stored in a behavior index DB of the embodiment of this invention.

FIG. 20 is an explanatory diagram for showing an example of a format of an event table stored in the behavior index DB of the embodiment of this invention.

FIG. 21 is an explanatory diagram for showing an example of a data set obtained after converting indices into a complex index in the embodiment of this invention.

FIG. 22A and FIG. 22B are explanatory diagrams for showing an example of an index pattern definition held by the analysis server of the embodiment of this invention.

FIG. 23A and FIG. 23B are explanatory diagrams for showing examples of an advice list held by the analysis server of the embodiment of this invention.

DETAILED DESCRIPTION OF THE PREFERRED EMBODIMENTS

This invention relates to a system for recommending a behavior pattern for activating a state of an organization to each individual, and has a feature that behavior data acquired by a sensor terminal worn on a human body is used. A description thereof is made below with reference to the accompanying drawings.

Now, an embodiment of this invention is described with reference to the attached drawings.

Figure 1:
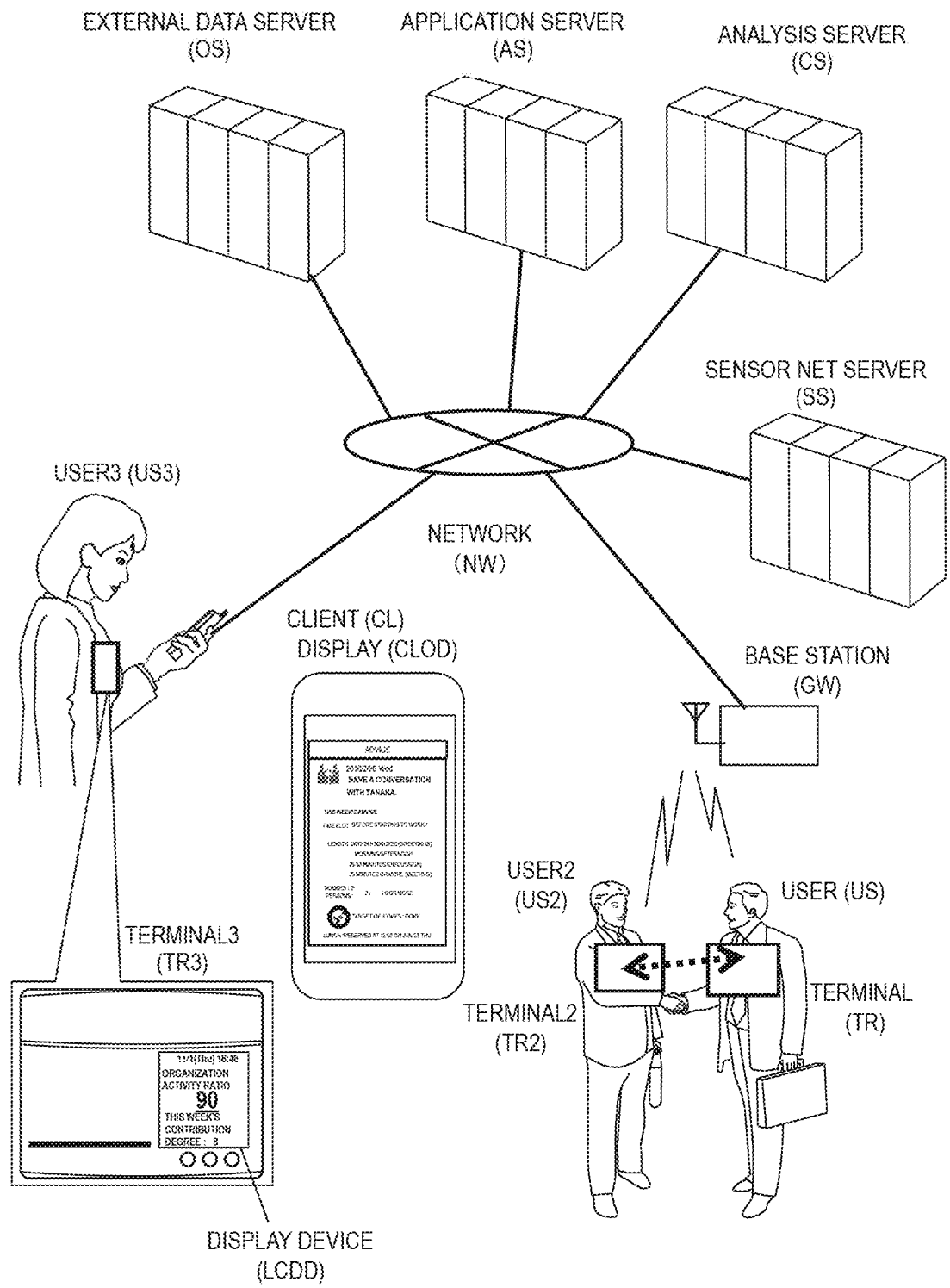
FIG. 1 is an explanatory diagram for illustrating an outline of a sensor data analysis system according to an embodiment of this invention.

<FIG. 1: System Outline>

FIG. 1 is an explanatory diagram for illustrating an outline of a sensor data analysis system according to the embodiment of this invention.

In the embodiment of this invention, users (US, US2, and US3, which are hereinafter referred to collectively as "US" when an individual is not identified) wear sensor terminals (TR, TR2, and TR3, which are hereinafter referred to collectively as "TR" when an individual is not identified), and sensing data (hereinafter assumed as triaxial acceleration data, but another means may be employed) relating to a movement of a wearer and sensing data relating to an interaction (face-to-face or proximate state) with another wearer are acquired by sensors (not shown) for measuring physical quantities, which are included in the terminal (TR). The interaction is detected by, for example, the respective terminals (TR) transmitting and receiving an infrared signal or other such radio signal to/from each other when the users (US) face each other.

The terminal (TR) is capable of outputting information obtained by processing the sensing data by a processing unit (not shown) included in the terminal or information received from a server (for example, application server (AS)) on a network through wireless or wired communications to a display device (LCDD) included in the terminal (TR).

Meanwhile, the acquired sensing data is transmitted to a base station (GW) coupled in a wireless or wired manner, and is stored in a sensor net server (SS) through the network (NW). An analysis server (CS) is configured to periodically acquire the data stored in the sensor net server (SS) to generate a behavior index, to generate an index relating to an activated state of the organization, to conduct statistical analysis between those indices, and to generate an advice list for each individual. The application server (AS) is configured to periodically acquire the behavior data and the advice list relating to a specific individual from the analysis server (CS) to generate a display screen for the individual, to transmit the display screen to the client (CL), and to display the display screen on a display (CLOD).

It is also possible to control an external apparatus (not shown) so as to optimize an environment by coupling the application server (AS) to, for example, an external data server (OS) configured to store task-related e-mail or schedule information, an air conditioner or other such external apparatus (not shown) that can affect a surrounding environment around the user (US), or an external sensor (not shown) configured to measure the surrounding environment, and statistically analyzing a relation between a value obtained therefrom and the index for indicating the activated state of the organization.

In one embodiment of this invention, the index relating to the activated state of the organization represents an index for directly or indirectly indicating a desired state of the organization. For example, the index may be an organization activity ratio calculated based on a frequency distribution of durations of body moving states of members (in the example of FIG. 1, user, user 2, and user 3) belonging to the organization for all the members of the organization, or may be an individual activity ratio calculated based on a frequency distribution of the duration of the body moving state of an individual or a frequency distribution of the durations of the body moving states of an individual and a plurality of members around the individual. In the former case, the frequency distribution of the durations of the body moving states of all the members (that is, of all pieces of data irrespective of which member each of the pieces of data has been acquired from) is generated based on measurement results of acceleration sensors of all the terminals worn on the members belonging to the organization, and the organization activity ratio is calculated based on the frequency distribution. With this configuration, an objective organization activity ratio is obtained. In another case, the index to be employed may include a productivity index, for example, a sales amount or a quantity of production, or a subjective index, for example, a sense of accomplishment or a sense of teamwork, which is collected through a questionnaire.

<FIG. 2 to FIG. 9: Example of Display Screen of Client>

FIG. 2 to FIG. 9 are explanatory diagrams of examples of a screen to be displayed on the display (CLOD) of the client (CL) of the embodiment of this invention.

Those screens are generated in the application server (AS) (ASCD), and displayed as a result of screen control (CLCC) for a client, but may be generated in the client (CL). In FIG. 2 to FIG. 9, the client (CL) is assumed to be a terminal with a small-sized touch panel, for example, a smartphone or a tablet, but the client (CL) may employ another means, for example, the web browser of a PC or a large-sized touch panel.

Figure 2:
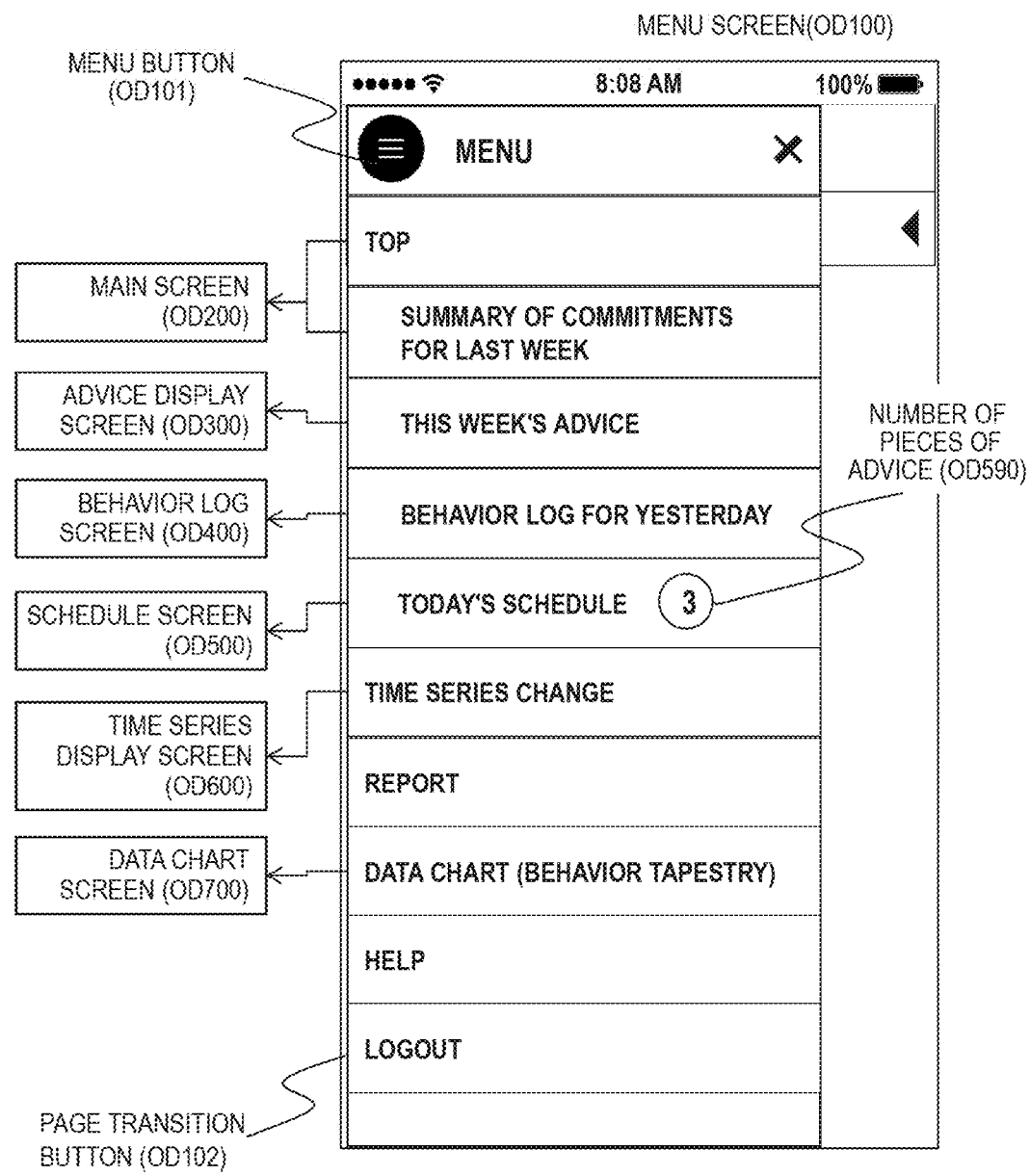
FIG. 2 to FIG. 9 are explanatory diagrams of examples of a screen to be displayed on a display of a client of the embodiment of this invention.

FIG. 2 is an illustration of a menu screen (OD100) for allowing the user (US) to transition to each screen. When an application of the menu screen (OD100) is running, a menu button (OD101) is constantly displayed on the corner of the menu screen (OD100). When the menu button (OD101) is pressed, the menu screen (OD100) is opened. When each page transition button (OD102) is pressed, the menu screen (OD100) is caused to transition to each screen. Examples of the screen of a transition destination include a main screen (OD200), an advice display screen (OD300), a behavior log screen (OD400), a schedule screen (OD500), a time series display screen (OD600), and a data chart screen (OD700). A number (OD590) of suggested pieces of advice and digest information may be displayed as an alert or a badge on the menu screen, a desktop of the client (CL), an external scheduler, or the like.

Figure 3:
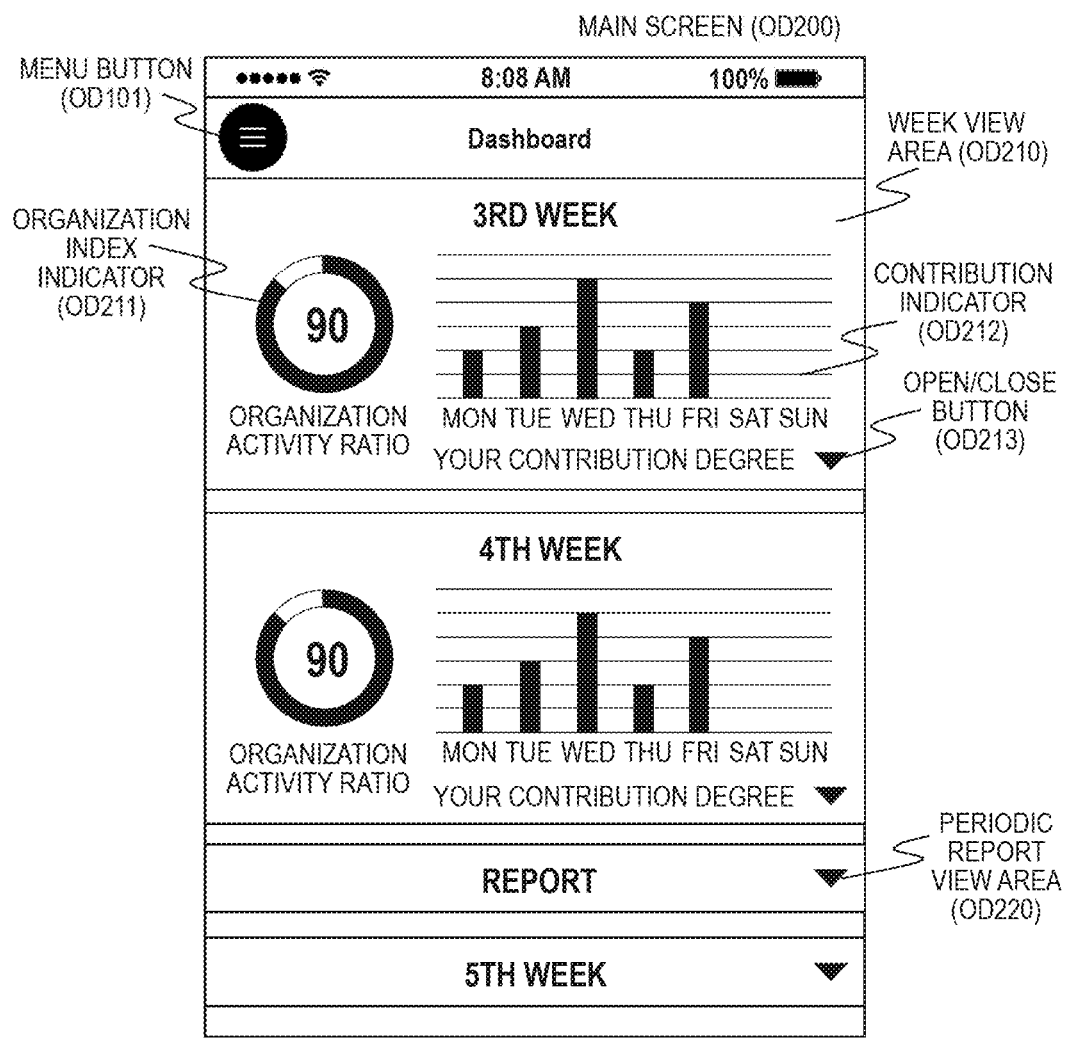

FIG. 3 is an illustration of an example of the main screen (OD200) for presenting information to the user (US).

The main screen (OD200) is divided into areas for each week. When the user (US) operates an open/close button (OD213) to open a week view area (OD210), the behavior log screen (OD400) is unfolded in the lower part of the main screen (OD200). Main indices are displayed in the week view area (OD210). The main indices include an organization index indicator (OD211) for indicating the index relating to the activated state of an organization and a contribution degree indicator (OD212) for indicating a degree to which the user (US) himself/herself has contributed in order to improve an organization index, for example, the number of times that the user (US) offered advice. It is also possible to arrange a periodic report view area (OD220) for presenting a summary of the behavior data on the main screen (OD200) periodically, for example, every four weeks, and unfold the periodic report view area (OD220), to thereby display a periodic report on the main screen (OD220).

Figure 4:
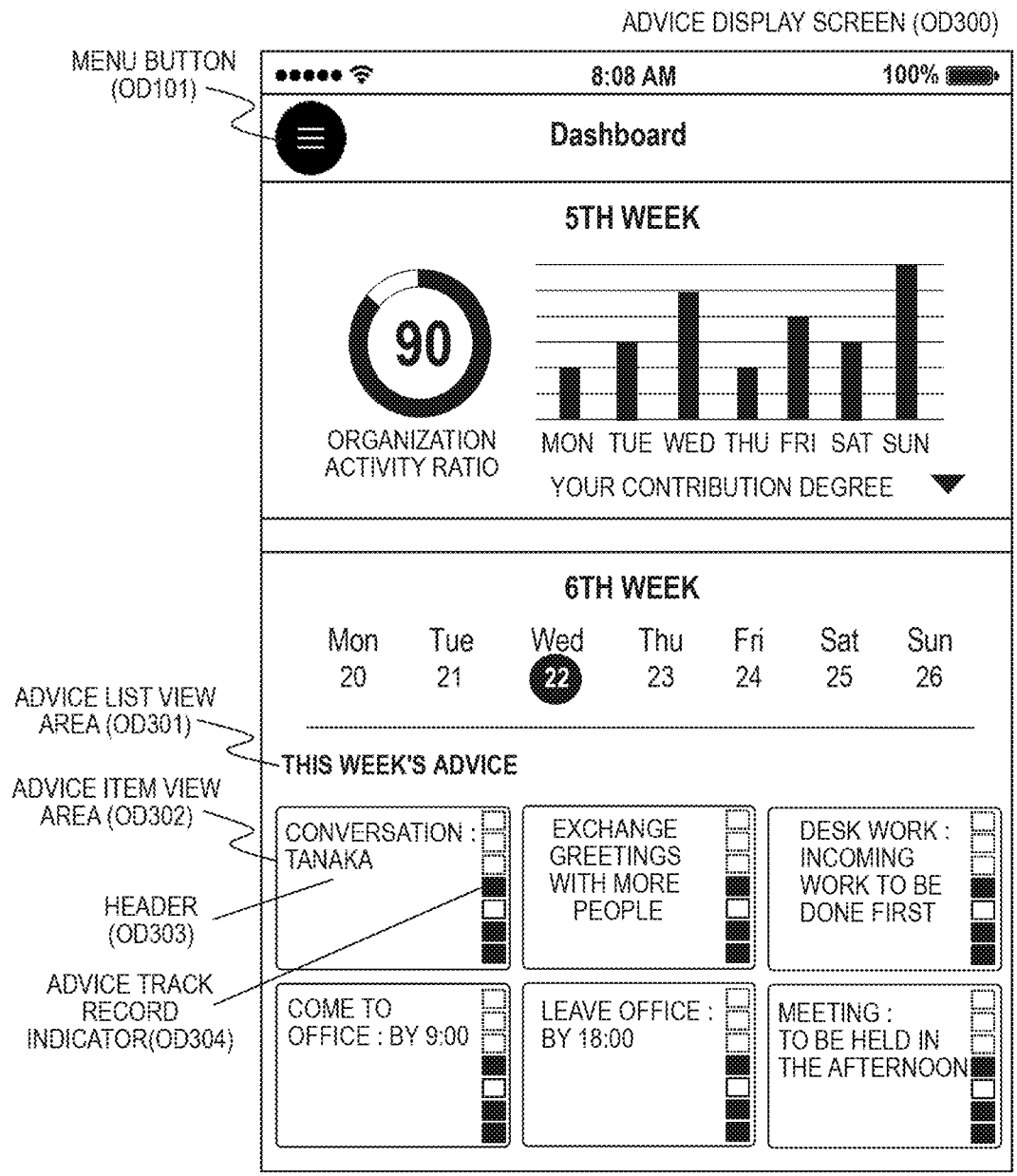

FIG. 4 is an illustration of the advice display screen (OD300). When the latest week view area (OD210) is unfolded, this week's advice for the user (US) is displayed. One or a plurality of kinds of advice for the logged-in user (US) is displayed in an advice list view area (OD301). Separate pieces of advice are each displayed in an advice item view area (OD302). The advice item view area (OD302) includes a header (OD303) of a piece of advice and an advice track record indicator (OD304) for indicating whether or not the piece of advice has already been followed.

The advice track record indicator (OD304) is updated when the behavior index corresponding to the piece of advice exceeds a target value or when a track record input (OD313) is manually conducted on an advice detail screen (OD310). The advice track record indicator (OD304) is also updated based on date. Examples of the advice to be presented include advice corresponding to a behavior index DB (CSDT) to be generated such as whether to increase or decrease conversation with a specific person, the time to come to or leave the office, and a time slot for a meeting or desk work and how to progress the meeting or desk work. When the behavior index DB (CSDT) to be generated includes information stored in the external data server (OS) such as e-mail or a schedule, there may be presented a piece of advice to optimize controllable factors relating to a workplace environment or an outside situation such as a timing to transmit or receive e-mail, how to progress the meeting with a person who is not wearing the terminal (TR), selection of an area, a room temperature, luminance of lights, or environmental sound.

Figure 5:
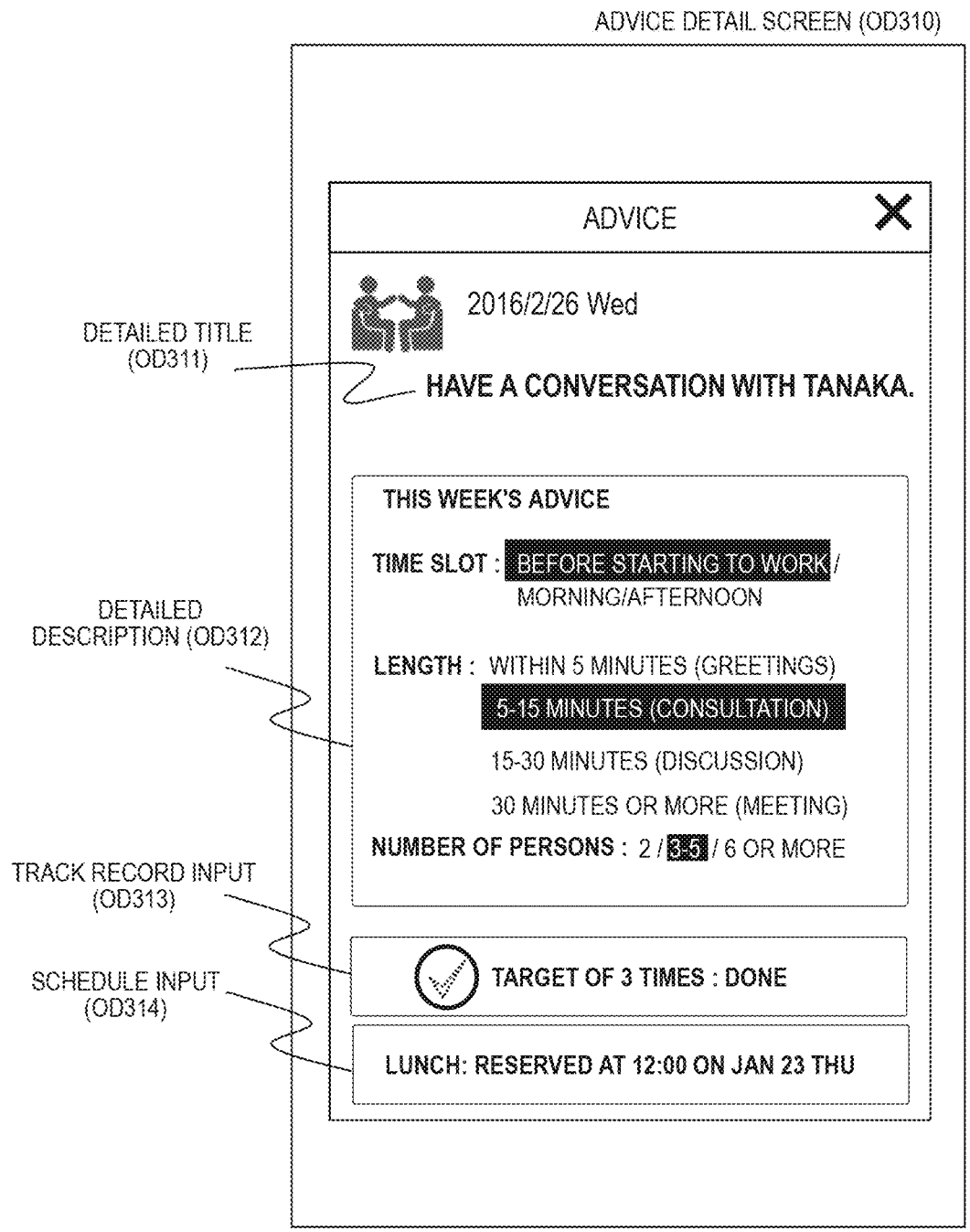

When the advice item view area (OD302) is selected, a window of the advice detail screen (OD310) of FIG. 5 is popped up. The advice detail screen (OD310) includes a detailed title (OD311) and a detailed description (OD312) to describe information that allows the user (US) to understand contents of the selected piece of advice. The advice detail screen (OD310) may also have functions of the track record input (OD313) that allows the user (US) to input the fact that the user (US) has followed the relevant piece of advice, a schedule input (OD314) that allows the user (US) to set a plan to meet an interested party included in scheduler information or the advice, or the like.

Figure 6:
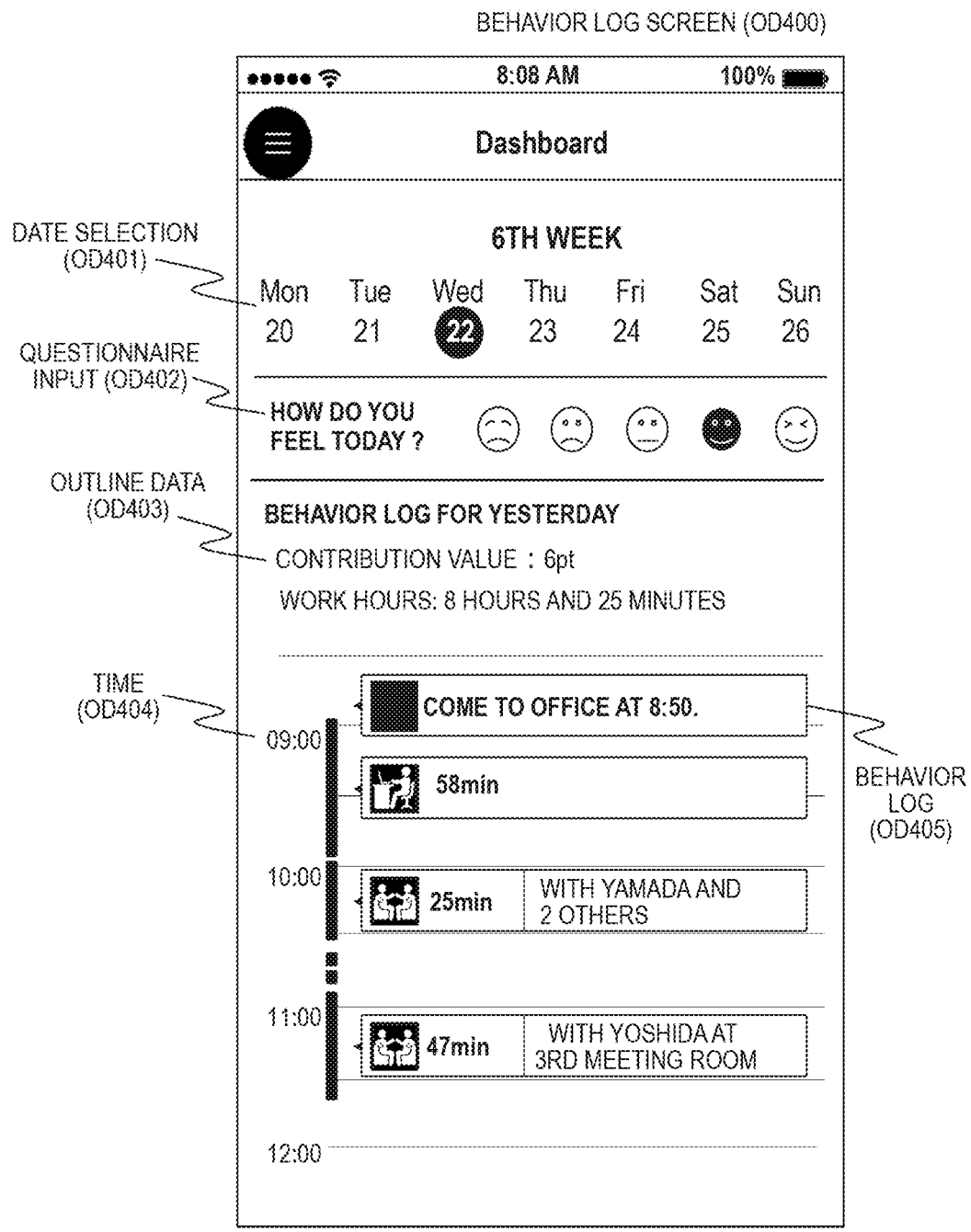

FIG. 6 is an illustration of the behavior log screen (OD400). When a past or present date is selected in a date selection (OD401) field, a behavior log (OD405) acquired from the terminal (TS) of the user (US) for the relevant day is displayed in a time series along a vertical time (OD404) axis. As information included in the behavior log (OD405), there are displayed, for example: an office arrival time; a start time, an end time, and a duration relating to the desk work, the conversation, or other such behavior; a conversation party; and area information. In addition, the behavior log screen (OD400) may also be provided with a questionnaire input (OD402) field and an outline data (OD403) field for indicating an outline of activities of the day. When the behavior log screen (OD400) is linked to the scheduler, information on the meeting and the like registered in the scheduler and information on an event notice written in an e-mail may be described together under the corresponding date and time slot.

Figure 7:
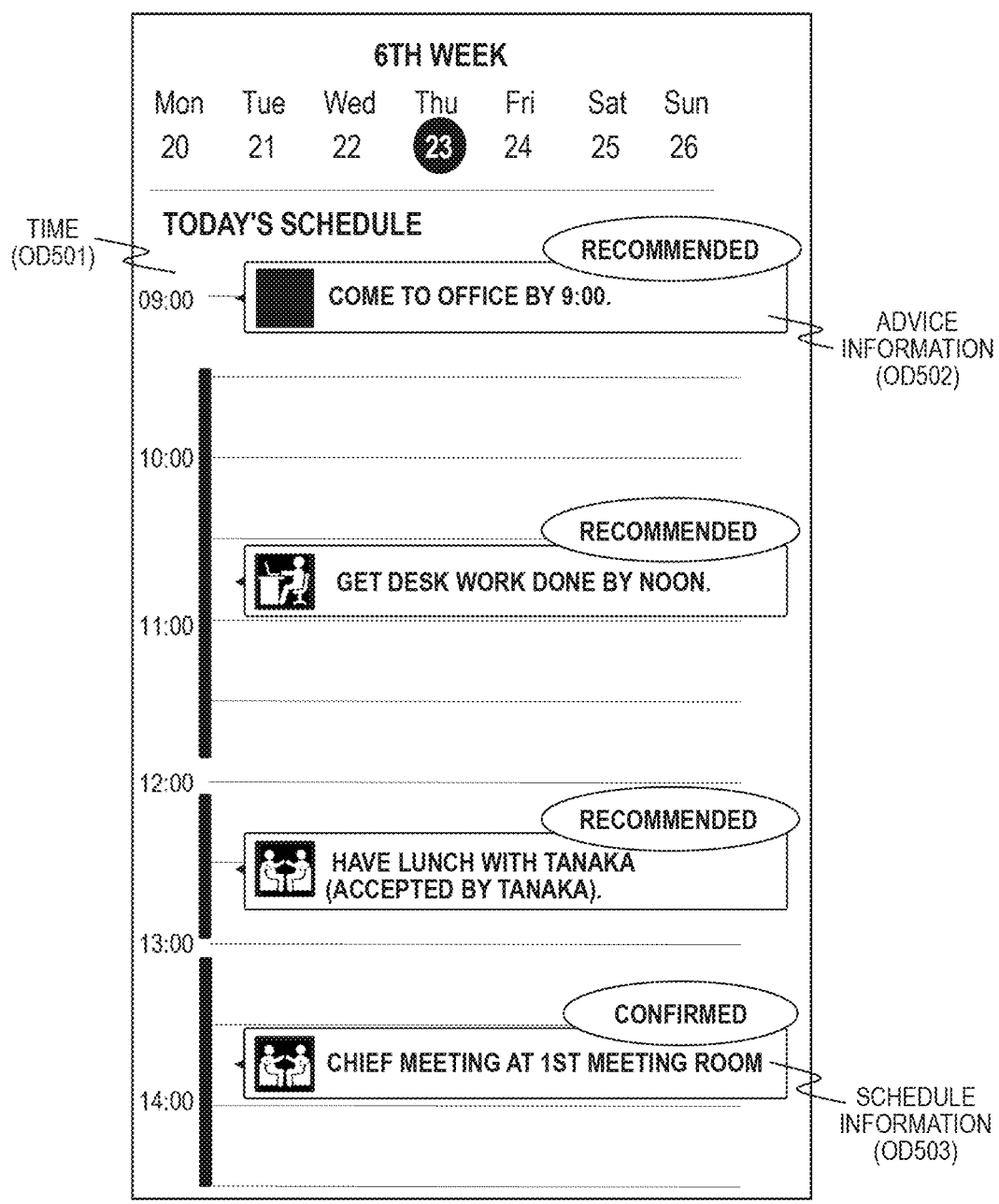

FIG. 7 is an illustration of a screen (OD500) for displaying a schedule in a page under the present date or a future date. On the screen (OD500), a piece of advice information (OD502) is displayed in association with a time (OD501) or a time slot indicated by the advice. In addition, a piece of schedule information (OD503) described in the scheduler or the like may be described.

Figure 8:
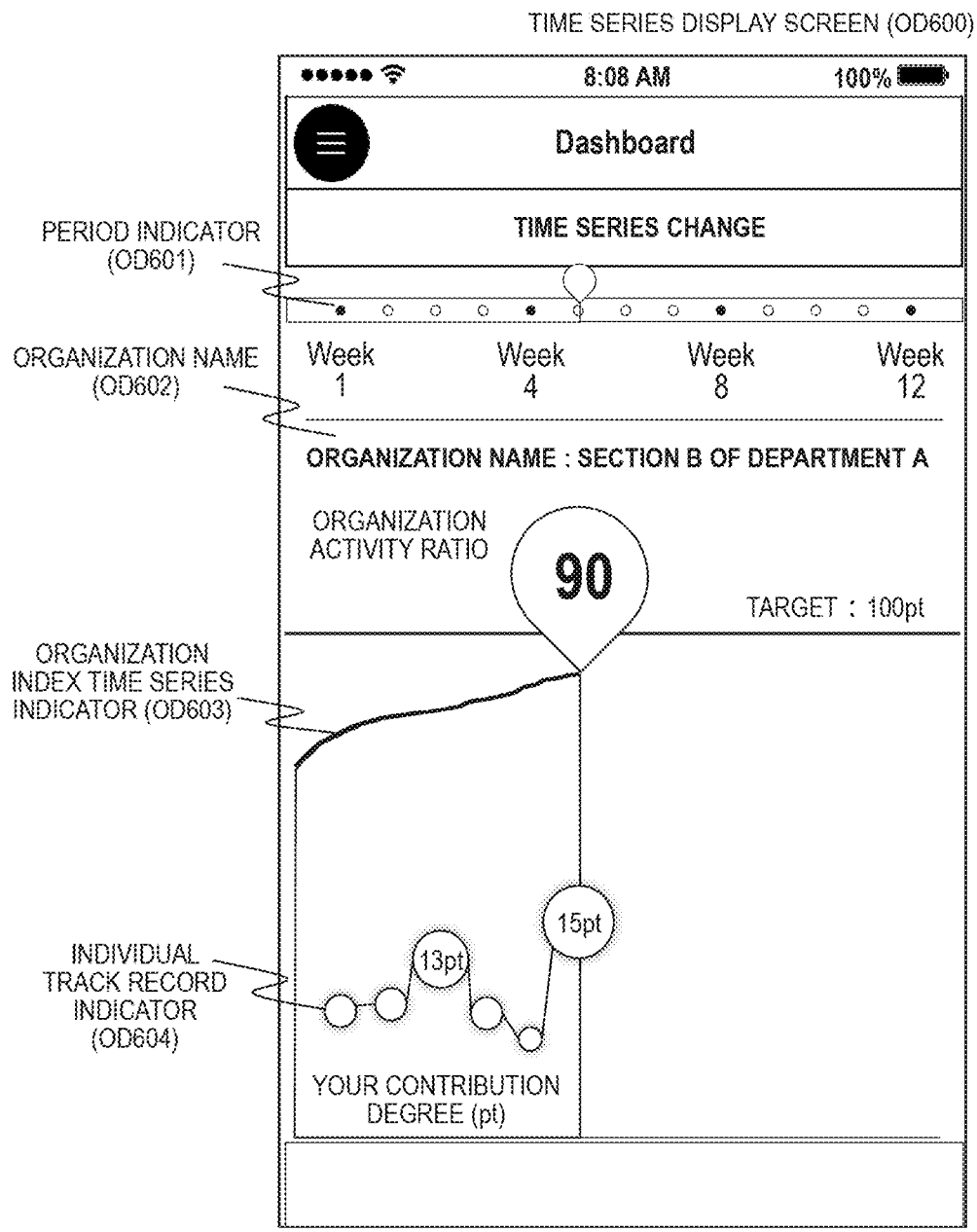

FIG. 8 is an illustration of the time series display screen (OD600) for displaying a specific index for the medium-to-long term. On the time series display screen (OD600), a period indicator (OD601) is displayed in a horizontal axis, and an organization name (OD602) of an organization to which the user (US) belongs, an organization index time series indicator (OD603) for indicating a change in organization index for the organization, and an individual track record indicator (OD604) for indicating a contribution degree (for example, the number of pieces of advice that have been carried out) of the user (US) for the organization are displayed in the stated order. This enables an understanding of a change in behavior of the user (US) and a change in states of the organization in association with each other.

Figure 9:
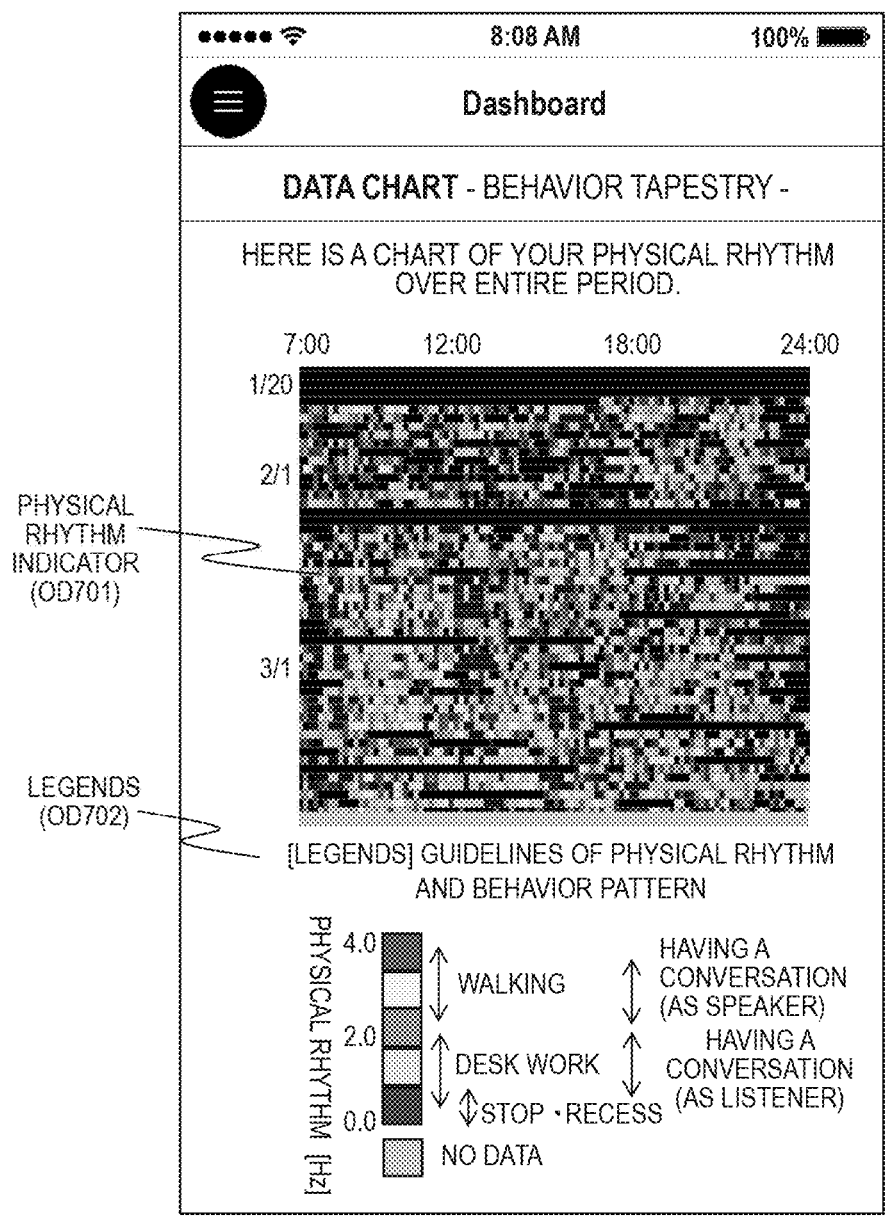

FIG. 9 is an illustration of the data chart screen (OD700) for visualizing individual data accumulated for a long term. On the data chart screen (OD700), frequencies of an acceleration are displayed as a physical rhythm indicator (OD701) in different colors in units of one minute, 10 minutes, or the like. In addition, explanatory legends (OD702) are described.

Figure 10:
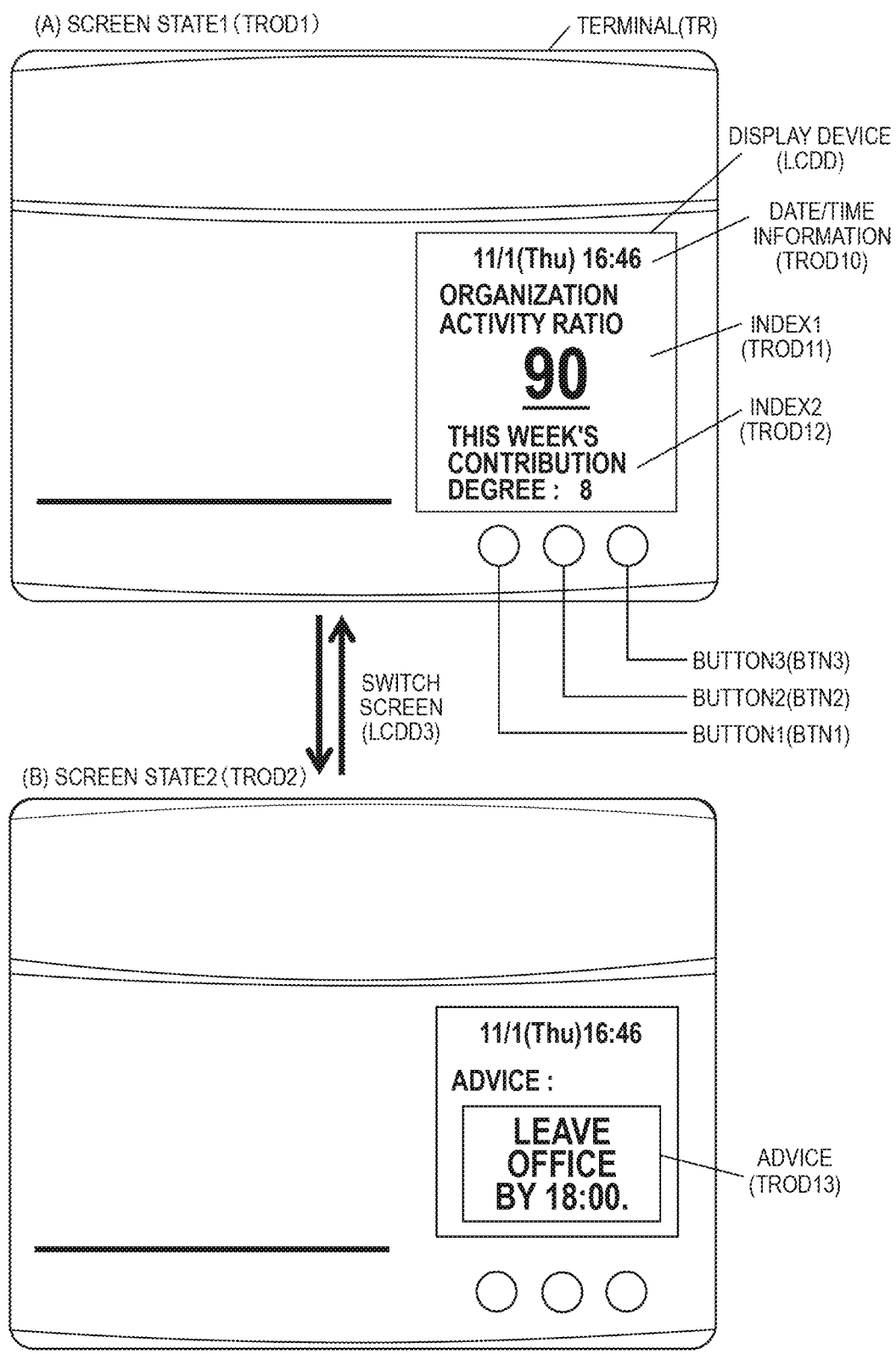
FIG. 10 is an explanatory diagram of an example of a screen to be displayed on a display device of a terminal of the embodiment of this invention.

<FIG. 10: Example of Display Screen of Terminal>

FIG. 10 is an explanatory diagram of an example of a screen to be displayed on the display device (LCDD) of the terminal (TR) of the embodiment of this invention.

The terminal (TR) is configured to display a piece of date/time information (TROD10) held by a clock (TRCK), indices (TROD11) (TROD12), and a piece of advice (TROD13) on the display device (LCDD). The indices (TROD11) (TROD12) and the piece of advice (TROD13) may be obtained as a result of subjecting sensor data to simplified behavior analysis (ANA) in the terminal (TR), or may be received from the application server (AS) in a wireless or wired manner. The terminal (TR) may be configured not only to display a piece of advice but also to output an alert at a time relating to the piece of advice through use of a speaker (SP) or an LED (not shown). The terminal (TR) includes buttons 1, 2, and 3 (BTN1, BTN2, and BTN3), and is capable of switching a screen state through operation of any one of the buttons (TROD1, TROD2, and LCDD3). Such a display mode allows the user (US) to easily grasp a desired behavior based on the analysis and to follow the advice at an appropriate timing.

Figure 11:
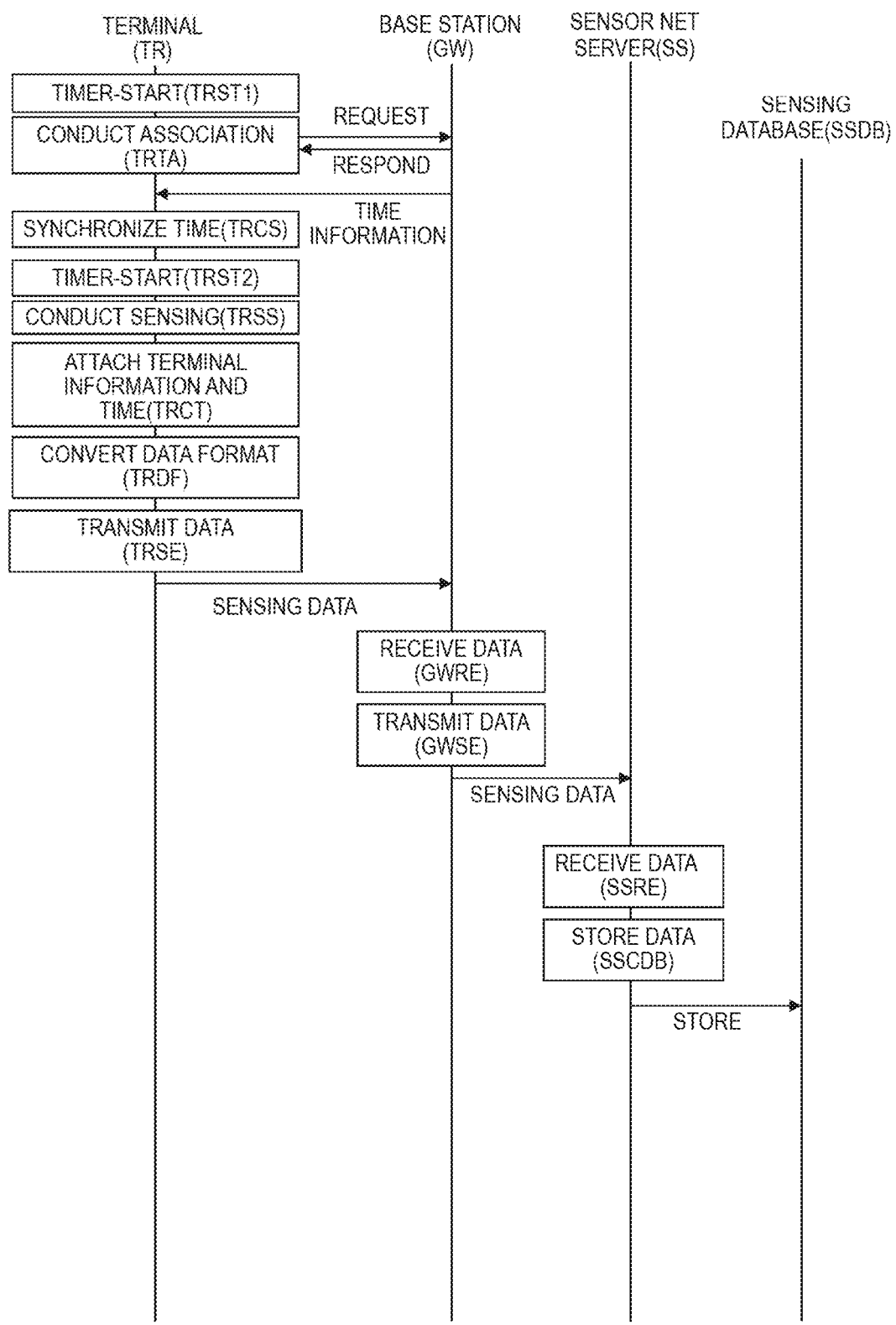
FIG. 11 is a sequence diagram for illustrating a procedure executed in the embodiment of this invention until sensing data acquired by each terminal worn on each of a plurality of users is stored in a sensor net server.

<FIG. 11: Sequence for Collecting Data>

FIG. 11 is a sequence diagram for illustrating a procedure executed in the embodiment of this invention until the sensing data acquired by each terminal (TR) worn on each of a plurality of users (US) is stored in the sensor net server (SS).

First, when the terminal (TR) is powered on and when the terminal (TR) is not in an associated state with the base station (GW), the terminal (TR) periodically conducts association (TRTA) by being timer-started (TRST1). The association is to define the terminal (TR) as being in a relationship of communicating to/from a given one base station (GW). When receiving an association response from the base station (GW) to be notified that the association is successful, the terminal (TR) subsequently conducts time synchronization (TRCS). In the time synchronization (TRCS), the terminal (TR) receives time information from the base station (GW), and sets the clock (TRCK) included in the terminal (TR). The base station (GW) regularly establishes coupling with a network time protocol (NTP) server (TS) to correct the time. With this correction, the time is synchronized across all the terminals (TR). Therefore, when an analysis is conducted later, pieces of data on persons which are collected at the same time can be compared with each other and analyzed through the comparison of the time information accompanying the sensing data.

Various sensors of the terminal (TR), which includes a triaxial acceleration sensor (AC) and a temperature sensor (AE), are timer-started at a fixed cycle period, for example, every ten seconds (TRST2), and sense an acceleration, sound, a temperature, an illuminance, and the like (TRSS). The terminal (TR) transmits and receives a terminal ID being one piece of terminal information (TRMT) to/from another terminal (TR) through infrared rays, to thereby detect a face-to-face state (specifically, whether or not the person wearing the relevant terminal has faced a person wearing another terminal at each time and, if positive, which person the person wearing the relevant terminal has faced). The various sensors of the terminal (TR) may be configured to constantly conduct the sensing without being timer-started (TRST). However, the starting at a fixed cycle period allows a power supply to be effectively used, and allows the terminal (TR) to be continuously used for a long period of time without being recharged.

The terminal (TR) adds the time information of the clock (TRCK) and the terminal information (TRMT) to the data obtained through the sensing (TRCT). The person wearing the terminal (TR) is identified by the terminal information (TRMT) when the data is analyzed later in the sensor net server (SS), the analysis server (CS), or the application server (AS).

In data format conversion (TRDF), the terminal (TR) adds tag information including conditions for the sensing to the sensing data, converts the sensing data into a predetermined transmission format, and records the sensing data in a storage unit (STRG) included in the terminal. The above-mentioned format is stored in common as data format information (GWMF) in the base station (GW) and data format information (SSMF) in the sensor net server (SS). After that, the data obtained through the conversion is transmitted to the base station (GW) through a wired or wireless network (TRSE). After receiving the data (GWRE), the base station (GW) adds, to the data, base station information (GWMG) on the base station through which the data has passed, and further transmits the data to the sensor net server (SS) through the wired or wireless network (GWSE). The sensor net server (SS) receives the data (SSRE), and stores the sensing data on all users (US) in a sensing database (SSDB) (SSCDB).

Figure 12:
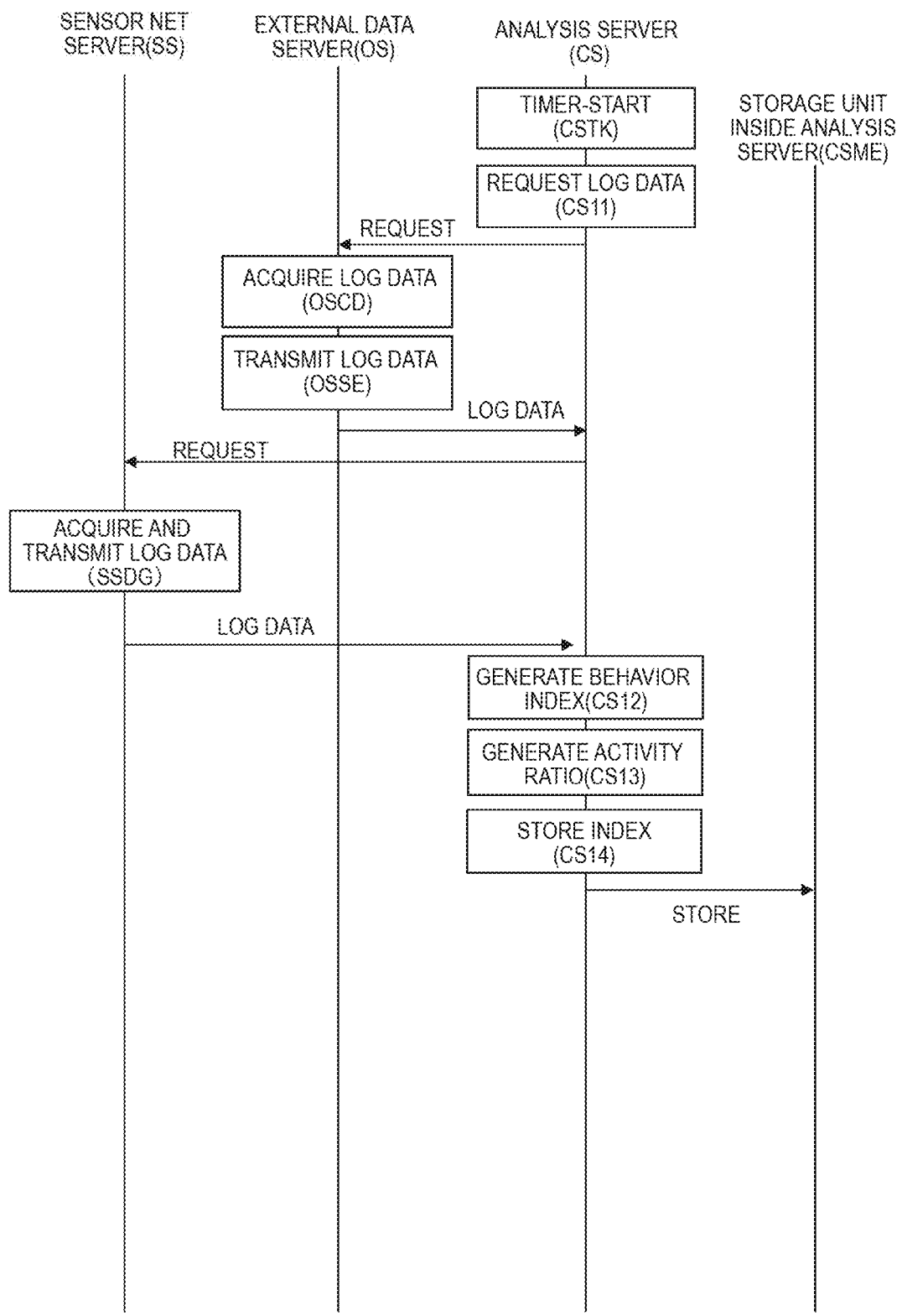
FIG. 12 is a sequence diagram for illustrating a procedure for processing for generating various indices from data by an analysis server of the embodiment of this invention.

<FIG. 12: Sequence for Generating Index>

FIG. 12 is a sequence diagram for illustrating a procedure for processing for generating various indices from the data by the analysis server (CS) of the embodiment of this invention.

The analysis server (CS) is timer-started at a predetermined time (CSTK), and starts processing for generating an index. First, the analysis server (CS) transmits a log data request (CS11) to the related servers including the sensor net server (SS) and the external data server (OS). The external data server (OS) classifies data having a predetermined characteristic of, for example, containing a specific keyword or date, among the data stored in the storage unit (OSME), for example, an e-mail transmission/reception log (OSMM) or schedule data (OSMS) (OSCT), acquires the data (OSCD), and transmits the log data (OSSE). The sensor net server (SS) acquires necessary data from the sensing database (SSDB) in response to the received request, and transmits the data to the analysis server (CS) (SSDG).

The analysis server (CS) applies an index generating program (not shown) within a storage unit (CSME) to the received log data based on a condition indicated in an analysis setting (CSDA), and generates the behavior index (CS12). At this time, the analysis server (CS) may store the received log data in the storage unit (CSME). In the same manner, the analysis server (CS) processes acceleration data by a program to generate the organization activity ratio and the individual activity ratio (CS13). Those pieces of data are stored in the behavior index DB (CSDT) or an organization/individual activity ratio DB (CSMA) of the storage unit (CSME) (CS14).

FIG. 19 is an explanatory diagram for showing an example of a format of a behavior index table (CSDTA) stored in the behavior index DB (CSDT) of the embodiment of this invention.

The analysis server (CS) complements the data based on the face-to-face information among a plurality of persons detected by their terminals (TR), and determines a list of times at which conversations took place and IDs of participants in the conversations. The analysis server (CS) assigns the same conversation ID (DTA2) to one conversation event, and in a case of a conversation involving three persons or more, assigns all combinations of all the IDs of the participants to a subject party ID (DTA3) column and an opposite party ID (DTA4) column. For example, the first six records of FIG. 19 include information relating to one conversation event involving three participants identified by IDs of "2695", "2696", and "2698". For the respective conversation events, there are also provided columns for recording a date (DTA1) and its accompanying information, for example, a time slot (DTA5), a duration (DTA6), a conversation area (DTA7), the number of persons who joined a conversation (DTA8), and a conversation characteristic (DTA9) for indicating directivity or the like of the conversation regarding which of a speaker or a listener the person corresponding to the subject party ID was. The accompanying information may be expressed as a continuous value instead of a character string.

Whether or not a conversation took place between persons and the directivity or the like of the conversation may be identified based on the face-to-face information obtained from a result of transmitting and receiving an infrared signal and acceleration information during the facing. Sound information may be used instead of (or in addition to) the acceleration information. In another case, the following processing may be conducted through use of the face-to-face information irrespective of whether or not a conversation took place between persons.

In FIG. 19, an example of the behavior index table relating to a behavior of facing another person among behaviors of a person is shown, but the analysis server (CS) may be configured to generate a behavior index table relating to another behavior, and to store the behavior index table in the behavior index DB (CSDT).

For example, the analysis server (CS) may be configured to identify the time slot in which each person was doing desk work based on the acceleration data, and to generate a behavior index table (not shown) relating to the desk work. The behavior index table relating to the desk work may be the same as the behavior index table (CSDTA) shown in FIG. 19 except that: information for identifying the desk work for each time slot is held instead of the conversation ID (DTA2); information for identifying an area where the desk work was done is held instead of the conversation area (DTA7); and the subject party ID (DTA3), the opposite party ID (DTA4), the number of persons (DTA8), and the conversation characteristic (DTA9) are not included.

The above-mentioned desk work is taken merely as an example of the kind of task, and the analysis server (CS) can generate a behavior index table relating to different kinds of tasks other than the desk work based on tasks of the organization. Further, respective behavior index tables relating to a plurality of kinds of tasks may be generated to be stored in the behavior index DB (CSDT).

In another case, the analysis server (CS) may be configured to generate a behavior index table (not shown) relating to time distribution of the behavior of each person based on the face-to-face information, the acceleration data, and, when necessary, other such information. The behavior index table relating to the time distribution may be the same as the behavior index table (CSDTA) shown in FIG. 19 except that: information for identifying each behavior is held instead of the conversation ID (DTA2); information for identifying an area where each behavior was performed is held instead of the conversation area (DTA7); and the subject party ID (DTA3), the opposite party ID (DTA4), the number of persons (DTA8), and the conversation characteristic (DTA9) are not included. The behavior index table relating to the time distribution may include, for example, the office arrival time and an office leaving time of each person, a total conversation time per day, and a total desk work time per day.

The behavior index DB (CSDT) also stores an event table (CSDTI) for recording the event information. The event table (CSDTI) may be acquired from schedule formation or the like stored in the external data server (OS), or may be manually input by the user (US) through the client (CL).

FIG. 20 is an explanatory diagram for showing an example of a format of the event table (CSDTI) stored in the behavior index DB (CSDT) of the embodiment of this invention.

The event table (CSDTI) stores, in association with a date (DTI1) and a subject party ID (DTI2), information including, for example, the number of meetings (DTI3), an average temperature (DTI4), a flag for indicating whether or not the relevant day is a day of leaving the office on time (DTI5), the presence or absence of a business trip (DTI6), the presence or absence of a drinking party (for example, drinking party after leaving the office on time) (DTI7), and a day of week (DTI8).

Figure 13:
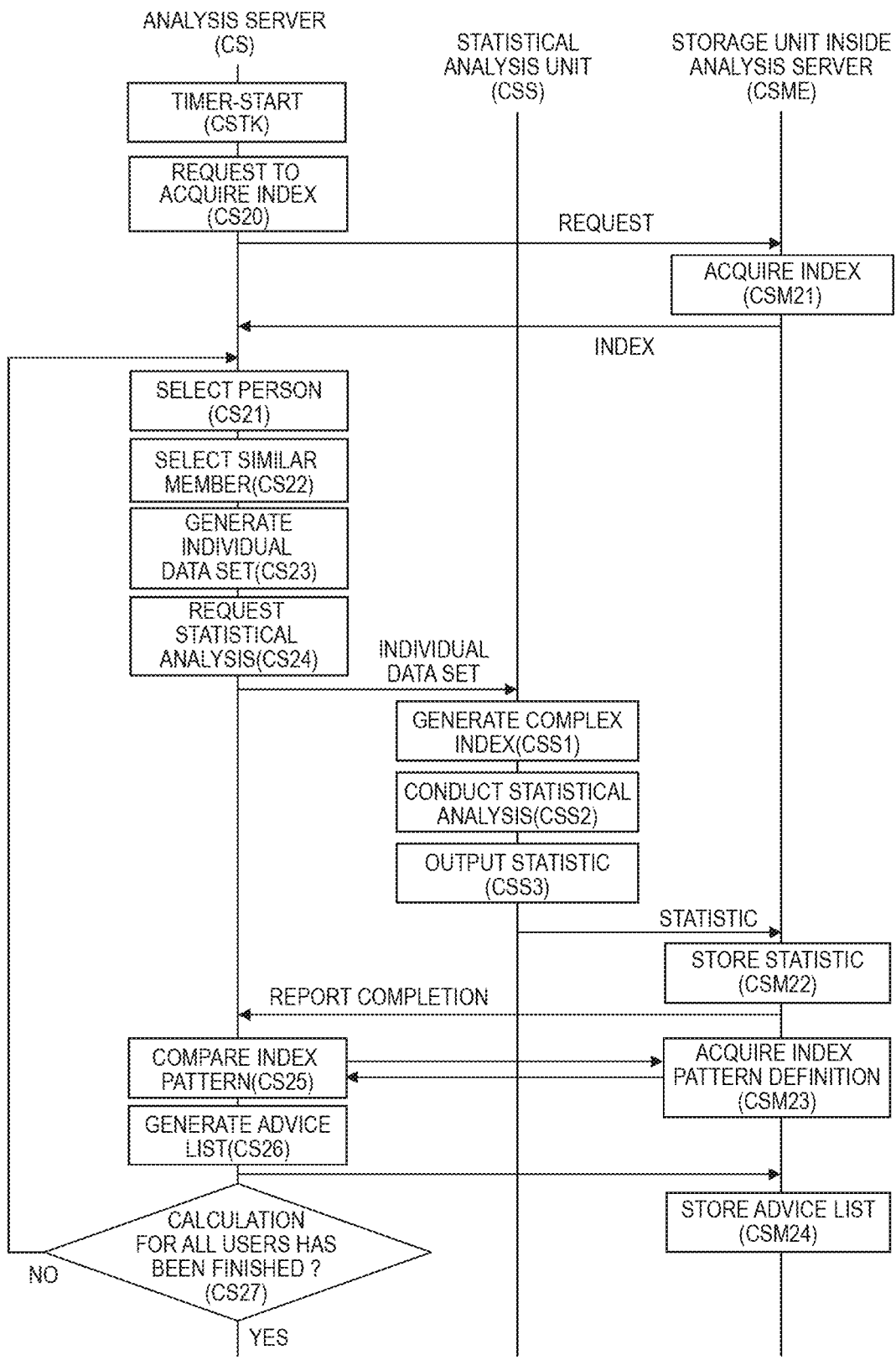
FIG. 13 is a sequence diagram for illustrating a procedure for processing for conducting statistical analysis and generating advice for each individual user by the analysis server of the embodiment of this invention.

<FIG. 13: Sequence for Generating Advice for Each Individual>

FIG. 13 is a sequence diagram for illustrating a procedure for processing for conducting statistical analysis and generating advice for each individual user (US) by the analysis server (CS) of the embodiment of this invention.

Figure 14:
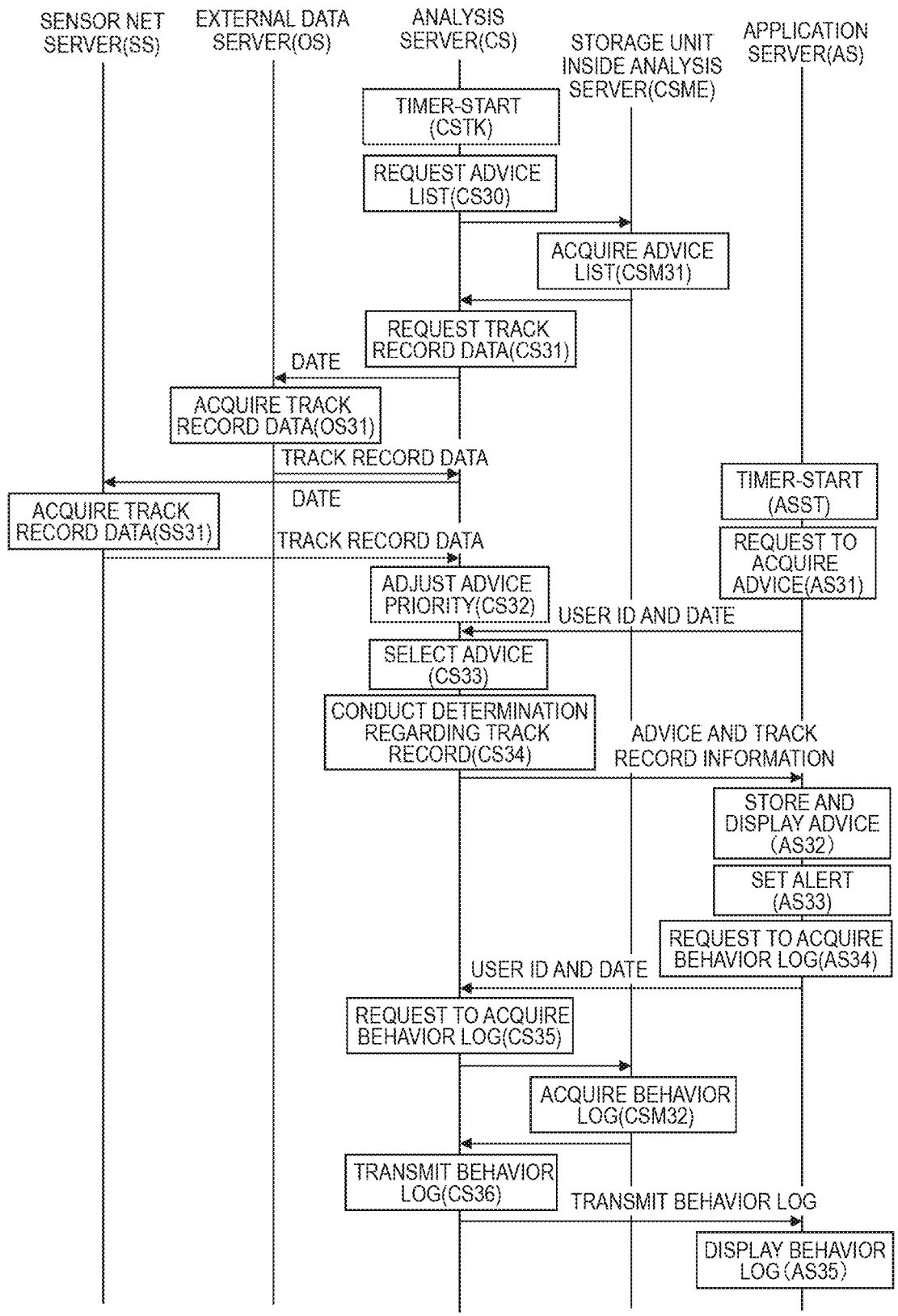
FIG. 14 is a sequence diagram for illustrating a procedure for processing for generating a screen to be displayed on the display of the embodiment of this invention.

Adjustment of advice to be presented depending on a situation of the relevant day can be executed with a light calculation load when the processing for generating advice for each individual, which is illustrated in FIG. 13, is executed every fixed period, for example, every week or every month, to generate an advice list, and processing for advice selection illustrated in FIG. 14 is executed more frequently than above, for example, every day. It should be understood that the processing of FIG. 13 may be executed every day, and every time the processing of FIG. 13 is brought to an end, the processing of FIG. 14 may be executed subsequently.

In FIG. 13, the analysis server (CS) is timer-started at a predetermined time (CSTK), and starts the processing for generating advice. First, the analysis server (CS) requests to acquire an index (CS20), and acquires the index stored in the behavior index DB (CSDT) and the organization/individual activity ratio DB (CSMA) of the storage unit (CSME) (CSM21).

Subsequently, the analysis server (CS) sequentially selects the user (US) (CS21), and selects, as a similar member, one person or a plurality of persons who have a behavior pattern similar to that of the selected user (US) (hereinafter referred to as "specific user (US)") or face the specific user (US) for a long period of time (CS22). In individual data set generation (CS23), the analysis server (CS) generates not only a behavior index and an activity ratio based on the behavior log for the specific user (US) himself/herself but also an explanatory variable group and an object variable including data relating to the similar member as an individual data set (CSDTAP) of the specific user (US) (CS23).

Meanwhile, the analysis server (CS) may generate the individual data set (CSDTAP) with an index based on only the behavior log for the subject person (that is, specific user (US)) without selecting the similar member (CS22). In this case, advice to be obtained is generated from the behavior pattern that has actually been performed by the subject person. However, when the similar member is selected, the behavior pattern that has not been performed by the subject person but has been performed by another person selected as the similar member may be generated as the advice, and hence novel advice expected to be highly effective for the subject person can be obtained.

Subsequently, to request a statistical analysis (CS24), the analysis server (CS) transmits the individual data set (CSDTAP) to a statistical analysis unit (CSS) along with the analysis setting (CSDA). The statistical analysis unit (CSS) first generates a complex index (CSS1), and generates a complex index for indicating a case satisfying a condition that combines two input indices or more.

FIG. 21 is an explanatory diagram for showing an example of a data set obtained after converting indices into a complex index in the embodiment of this invention.

The individual data set (CSDTAP) includes: a date (DTAP1); a subject party ID (DTAP2) for identifying the specific user (US); an object variable (DTAP3), for example, the organization activity ratio; and a complex index (DTAP4) generated from the behavior indices for the specific user (US) for each day. As described later, the processing from CS21 to CSM24 is repeated for each user (US) until the calculation is finished for all the users (US), and hence the individual data sets (CSDTAP) are generated for the respective users (US).

For example, as an example of the complex index (DTAP4) generated from three behavior indices, in a case where the specific user (US) (in the example of FIG. 21, person identified by an ID of "2695") did desk work in the morning on the day of leaving the office on time, the analysis server (CS) may add a value obtained by normalizing the number of times that the case occurred to the individual data set (CSDTAP). In the same manner, the analysis server (CS) may add the number of times that a case where the specific user (US) did the desk work in the afternoon on the day of leaving the office on time occurred, or may add a value obtained by counting and normalizing the number of times that the specific user (US) faced another person in a predetermined time slot (for example, before starting to work, in the morning, in the afternoon, or after leaving the office on time) for each opposite party involved in the facing.

In other words, the values of the complex index (DTAP4) indicate an amount of a behavior satisfying a predetermined condition (for example, at least one of the number of times of having a conversation with the specific user in a specific time slot or a time period taken for the conversation), which was performed by each user (US), for each condition. For example, the predetermined condition may be: any one of a conversation party for each user (US), a time slot in which the conversation took place, a duration of the conversation, a place where the conversation took place, the number of participants in the conversation, and the directivity of the conversation or a combination of some of those; the kind of task (for example, desk work) performed in each time slot; or a condition relating to the time distribution (for example, office arrival time), and may further include an event for each day (for example, day of week).

Subsequently, the analysis server (CS) exhaustively calculates statistical relations between a specific object variable (DTAP3) designated in advance within the data set and all indices including a complex index (CSS2), and stores the value of a statistic obtained as a result thereof, for example, a correlation coefficient, a regression coefficient, or a significance probability, in a statistic table (CSMC) of the storage unit (CSME) in association with each index (CSS3) (CSM22). As described with reference to FIG. 19, when not only the behavior index table relating to the facing but also the behavior index table relating to another behavior is created, the processing from CS24 to CSM22 is repeatedly executed for the respective behavior index tables.

For example, a correlation between the amount of the behavior satisfying the above-mentioned predetermined condition and the organization activity ratio being the object variable is calculated. Specifically, for example, the correlation between the organization activity ratio and the number of times of having a conversation with any one of the users, the number of times that the desk work was done in any one of the time slots, or the number of times that specific time distribution was conducted may be calculated.

When the storage is completed, the analysis server (CS) compares a combination pattern of indices among all the complex indices determined to have a significant relation with the object variable (to satisfy a predetermined condition that, for example, a strength of the correlation exceeds a predetermined strength) as a result of the statistical analysis (CSS2) as an index pattern definition (CSMP) file (CSM23) (CS25), extracts a complex index in which advice is defined, generates an advice list (CS26), and stores the advice list (CSM24). The analysis server (CS) repeats the processing from CS21 to CSM24 until the calculation is finished for all the users (US) (CS27).

FIG. 22A and FIG. 22B are explanatory diagrams for showing an example of an index pattern definition (CSMP) held by the analysis server (CS) of the embodiment of this invention.

The index pattern definition (CSMP) includes advice corresponding to the statistical relation (for example, correlation) between the amount of the behavior satisfying such a predetermined condition as shown in FIG. 21 and the index relating to the activated state of the organization (for example, organization activity ratio). Specifically, the index pattern definition (CSMP) includes, as advice corresponding to a positive correlation between the amount of the behavior satisfying a given condition and the organization activity ratio, a piece of advice to promote an increase of the amount of the behavior satisfying the given condition, and includes, as advice corresponding to a negative correlation between the amount of the behavior satisfying a given condition and the organization activity ratio, a piece of advice to promote a decrease of the amount of the behavior satisfying the given condition.

In FIG. 22A and FIG. 22B, as an example, the complex index that combines two behavior indices is shown, but a complex index that combines three behavior indices or more or a single index (single behavior index that does not involve combined indices) may also be defined in the same manner as described below.

The index pattern definition (CSMP) includes definitions for all combinations of two indices forming a complex index (P10), that is, an index A (P11) and an index B (P12). In addition, the respective indices A and B are each formed of an index name and a value. The index name corresponds to the name of the column within the behavior index table (CSDTA) of FIG. 19, and the value corresponds to a value that defines a range of data included in the column. When the value is a character string, values having the same number as that of kinds of character strings are defined. When the value is a numerical value, the range of data may be classified and defined automatically or based on a fixed reference value.

An index class (P20) and an advice text (P30) are defined for each pattern of the complex index (P10). The index class (P20) includes definitions of a pattern ID (P21) and a type (P22) that are unique to a complex index. The type is used to determine an icon to be displayed on the advice display screen (OD300) or the advice detail screen (OD310) and to select the advice. In the advice text (P30), a header (P32) to be described as the header (OD303) of the advice, a detailed title (P33) to be described as the detailed title (OD311) of the advice, and a piece of detailed information (P34) to be described as the detailed description (OD312) are defined in association with a condition (P31) for indicating whether the correlation between the object variable and the complex index is positive or negative. The value "null" is set for the complex index that is not to be used for the advice. When the condition (P31) indicates the positive correlation, a piece of advice to increase the value of the corresponding complex index is defined, and when the condition (P31) indicates the negative correlation, a piece of advice to decrease the value of the corresponding complex index is defined.

In the example of FIG. 22A and FIG. 22B, the first record of the index pattern definition (CSMP) indicates that a piece of advice to increase conversation with a specific conversation party (for example, person AA) is output when there is a positive correlation between the number of times that a given person had a conversation with the relevant conversation party and the organization activity ratio. In this case, the example of the positive correlation is shown, but when there is a negative correlation, a piece of advice to decrease the conversation is output. When there is a correlation between the number of times of having a conversation satisfying a specific condition, for example, the number of times of having a conversation with 3 persons to 5 persons for 5 minutes to 15 minutes before starting to work, and the organization activity ratio, the specific condition is output together as illustrated in, for example, FIG. 5.

Further, the fifth record indicates that a piece of advice to prioritize incoming work is output when there is a positive correlation between the number of times that desk work was done for a duration of less than 5 minutes in the time slot of the afternoon and the organization activity ratio. There is a person who can contribute more to the organization activity ratio by concentrating on the desk work for a longer period of time depending on his/her capabilities, his/her role within the organization, and the like, while there is a person who can contribute more to the organization activity ratio by, for example, more positively stopping the desk work to handle a consultation when being asked for the consultation by another person. In the above-mentioned example, the advice is assumed to be output to the latter person.

In addition, the sixth record indicates that a piece of advice to delay the office arrival time is output when there is a positive correlation between the office arrival time and the organization activity ratio, and the seventh record indicates that a piece of advice to come to the office earlier is output when there is a negative correlation between the office arrival time and the organization activity ratio.

In this manner, by providing advice suitable for the conversation, the desk work, the time distribution, and the like and outputting the advice when the condition is satisfied, it is possible to promote the behavior of each person that contributes to the improvement of the organization activity ratio.

FIG. 23A and FIG. 23B are explanatory diagrams for showing examples of the advice list held by the analysis server (CS) of the embodiment of this invention.

The advice list is a list for storing an item of the advice to be presented to the user (US) having a relevant subject party ID (MLA1) (MLB1), its priority, and its target value. The complex index having the relation between the object variable and the complex index determined to be significant based on a result of the statistical analysis (CSS2) and having a result of an index pattern comparison (CS25) being other than "null" is extracted, and two kinds of advice lists are generated. When the complex index includes the ID of the conversation party (that is, the complex index includes an index for indicating the amount of a conversation with a specific opposite party (at least one of the number of times of having the conversation or a time period for the conversation)), the type (P22) is defined as the conversation party in the index pattern definition (CSMP). The list obtained by summarizing the indices for this case is an advice list A (CSML_A) shown in FIG. 23A.

The advice list A (CSML_A) has a format of defining information for a pair of the subject party ID (MLA1) and an opposite party ID (MLA2) in the conversation. Specifically, the advice list A (CSML_A) includes a priority (MLA3), a flag (MLA4) for indicating whether or not the correlation between the object variable and the complex index is a positive correlation, a target value (MLA5), and columns of other items having the same number as the number of combinations of kinds of names and values of the columns existing in the behavior index table (CSDTA).

The priority (MLA3) is determined from the result of the statistical analysis conducted for the number of times of having a conversation with an opposite party indicated by the opposite party ID (MLA2) or a time period for the conversation in terms of the object variable. For example, a value obtained by multiplying the absolute value of the correlation coefficient by 100 is used as the priority (MLA3). The positive correlation flag (MLA4) stores 1 when the conversation with the opposite party is to be increased (that is, when the object variable (for example, organization activity ratio) increases by increasing the conversation), and stores 0 when the conversation is to be decreased (that is, when the object variable increases by decreasing the conversation). The target value (MLA5) is determined based on the past track record of the behavior satisfying a predetermined condition. For example, the target value of the number of times of having the conversation with the opposite party or a time period for the conversation is input by reflecting the value of the individual data set (CSDTAP). Specifically, for example, an average value of the number of times of having the conversation with the opposite party per day within the past track record of the individual data set (CSDTAP) is set as the target value (MLA5). By thus determining the target value and displaying the target value, it is possible to provide the user with a suitable guideline for the amount of the behavior to be performed based on the advice. 1 is input to the other indices (MLA6 to MALn) when a relationship between the complex index of the corresponding opposite party ID and the object variable is determined to be significant (for example, when the strength of the correlation between the amount of the behavior satisfying each condition and the object variable exceeds a predetermined strength).

The complex index that does not include the opposite party ID is stored in the format of an advice list B (CSML_B) shown in FIG. 23B. The advice list B (CSML_B) includes the subject party ID (MLB1) and a pattern ID (MLB2) of the combined indices, and stores, in association with those IDs, a type (MLB3), a positive correlation flag (MLB4), a priority (MLB5), and a target value (MLB6). The pattern ID (MLB2) and the type (MLB3) are the same as the pattern ID (P21) and the type (P22), respectively, of FIGS. 22A and 22B, and a text of the advice to be presented on the display (CLOD) is identified when the application server (AS) refers to the index pattern definition (CSMP) with the pattern ID (P21) being used as an argument. The positive correlation flag (MLB4), the priority (MLB5), and the target value (MLB6) are the same items as the positive correlation flag (MLA4), the priority (MLA3), and the target value (MLA5), respectively, of the advice list A (CLML_A).

The advice list B (CSML_B) may further include information for indicating a priority corresponding to a combination of the complex index and the event for each day. In FIG. 23B, as an example, a priority (MLB7) on the day of leaving the office on time and a priority (MLB8) on a day of a drinking party are shown. The priority (MLB7) on the day of leaving the office on time is a priority obtained when a condition that the relevant day is the day of leaving the office on time is further added to the complex index corresponding to each pattern ID. The priority (MLB8) on the day of the drinking party is a priority obtained when a condition that there is a drinking party on the relevant day is further added to the complex index corresponding to each pattern ID.

For example, with reference to the examples of FIG. 23B, FIG. 22A and FIG. 22B, the first record of the advice list B (CSML_B) indicates that there is a positive correlation between the amount (for example, the number of times) of the behavior satisfying the condition of "having a conversation (for example, greetings) for a duration of less than 5 minutes in a time slot of before starting to work", which was performed by a person identified by a subject party ID of "2695", and the organization activity ratio. In other words, it is indicated that the organization activity ratio is improved by advising the person to "exchange short greetings with more people before starting to work" to increase the chance that the person performs the behavior following the advice.

In this example, the priority (MLB5) is "54". This indicates that the relevant advice for the relevant person has a priority of 54. This may indicate that, for example, the correlation coefficient between the amount (for example, the number of times of exchanging greetings) of the relevant person's behavior satisfying the relevant condition and the organization activity ratio is 0.54. Meanwhile, the priority (MLB7) on the day of leaving the office on time and the priority (MLB8) on the day of the drinking party are "5" and "24", respectively. The former indicates that the correlation coefficient between the amount of the behavior of the relevant person for a case where, for example, the condition of "on the day of leaving the office on time" is added to the condition for the above-mentioned behavior and the organization activity ratio is 0.05, while the latter indicates that the correlation coefficient between the amount of the behavior of the relevant person for a case where, for example, the condition of "on the day of the drinking party" is added to the condition for the above-mentioned behavior instead of "on the day of leaving the office on time" and the organization activity ratio is 0.24.

In the same manner, the advice list B (CSML_B) may include a priority for a case where an arbitrary event for each day is added as a condition, for example, a priority on each day of week, a priority on a day of a business trip, or a priority for each range of a temperature.

<FIG. 14: Sequence for Generating Screen>

FIG. 14 is a sequence diagram for illustrating a procedure for processing for generating a screen to be displayed on the display (CLOD) of the embodiment of this invention.

In the advice list generation (CS26), a list of candidates for the advice is generated from the result of the statistical analysis conducted for the data for a medium-to-long term, for example, the past several weeks. In order to display some pieces of advice in the advice list view area (OD301), it is necessary to select several advice items to be presented to the user (US) from the above-mentioned list. In that case, a predetermined number of advice items may be selected in descending order of the priority (MLA3) (MLB5). However, even when the advice list generation (CS26) is executed with the above-mentioned order every day, a statistical trend exhibits a small change, and hence almost the same advice items are displayed every day. It is most crucial for the user (US) to follow the advice. Therefore, it is necessary to select the advice by reflecting not only the strength of statistical grounds but also how easily the user (US) can follow the advice on the priority (MLA3) (MLB5). FIG. 14 is an illustration of a flow including advice priority adjustment (CS32), for determining the advice item and the behavior log (AS35) to be presented to the user (US) on the relevant day.

First, the analysis server (CS) is timer-started at a predetermined time after the advice list generation (CS26) is completed, for example, early in the morning every day (CSTK), and acquires items having a plurality of users (US) as the subject party ID (MLA1) (MLB1) from the advice list within the storage unit (CSME) (CS30) (CSM31). Subsequently, the analysis server (CS) designates a date, for example, the previous day or the past one week, and requests track record data from the external data server (OS) and the sensor net server (SS) (CS31). The track record data represents a value of the behavior index corresponding to the advice for the relevant date and the relevant corresponding user (US). For example, the track record data corresponds to a "total meeting time" obtained from the schedule data, the "number of times of having a conversation within 5 minutes before starting to work" obtained from the sensing data, or the like. When a track record value exceeds the target value (MLA5) (MLB6), it is determined that the advice was carried out, and an item of the advice track record indicator (OD304) corresponding to the relevant date is highlight-displayed. After acquiring the track record data from the external data server (OS) and the sensor net server (SS) (OS31) (SS31), the analysis server (CS) may store the track record data in the storage unit (CSME). Subsequently, the analysis server (CS) refers to the acquired track record data to conduct the advice priority adjustment (CS32) and change the value of the priority (MLA3) (MLB5) within the advice list (CSML_A) (CSML_B). This processing is described later in detail with reference to FIG. 24.

Subsequently, the application server (AS) is started at a predetermined time or at a timing when the user (US) logs in (ASST), and requests the analysis server (CS) to acquire the advice (AS31) with the user ID and the date being designated. The analysis server (CS) selects a predetermined number of advice items corresponding to the user ID and the date in descending order of the priority (MLA3) (MLB5) (CS33). The analysis server (CS) also determines whether or not the track record value for the relevant date exceeds the target value (CS34), and returns information on the advice item and the track record value to the application server (AS).

For example, the analysis server (CS) may generate the behavior index based on the track record data acquired in the track record data acquisition (OS31) (SS31), and may determine whether or not the advised behavior (for example, having a conversation with a predetermined person) has been performed based on the behavior index. When the behavior has been performed, the analysis server (CS) may determine the amount of the performed behavior (for example, the number of times of actually having a conversation per day), and may transmit a result of the determination to the application server (AS). In another case, the user himself/herself may operate the track record input (OD313) on the advice detail screen (OD310) illustrated in, for example, FIG. 5, and when the fact that the advised behavior has been performed is input, the client (CL) may transmit the input information to the application server (AS).

The application server (AS) stores the advice item and the track record value that have been acquired in an advice selection list (ASML) of a storage unit (ASME), and reflects the advice item and the track record value in the display screen generation (ASCD) (AS32). With this processing, for example, the advice display screen (OD300) illustrated in FIG. 4 and the advice detail screen (OD310) illustrated in FIG. 5 are generated. When the track record of the advised behavior is acquired as described above, the information is reflected in, for example, the advice track record indicator (OD304) of the advice display screen (OD300) illustrated in FIG. 4 and the individual track record indicator (OD604) of the time series display screen (OD600) illustrated in FIG. 8. In the example of FIG. 8, the individual track record is displayed for each week, but may be displayed in arbitrary units, for example, every day or every month.

In addition, the application server (AS) sets an alert in the client (CL) for the advice having a distinctive feature in the timing to be performed, for example, the advice to leave the office by 18:00 (AS33), and presents the alert to the user (US) at a predetermined time through a speaker (CLSP), a pop-up on the display (CLOD), or the like.

Subsequently, the application server (AS) requests to acquire the behavior log (AS34), while the analysis server (CS) acquires data on the corresponding date and user ID within the storage unit (CSME) (CS35) (CSM32), and returns the behavior log to the application server (AS) (CS36). The application server (AS) reflects the acquired behavior log in the display screen generation (ASCD) based on settings of a display setting file (ASDF) (AS32). With this processing, the behavior log screen (OD400) illustrated in, for example, FIG. 6, is generated. The advice acquisition and the behavior log acquisition may be executed in any order.

<FIG. 15 to FIG. 18: Block Diagrams of Overall System>

FIG. 15 to FIG. 18 are block diagrams for illustrating an overall configuration of a sensor network system for implementing a sensing data display device of the embodiment of this invention. Although separately illustrated for the sake of illustration, the respectively illustrated pieces of processing are executed in coordination with one another. In FIG. 15 to FIG. 18, respective functions are implemented by cooperation between hardware and software. As apparent from FIG. 15 to FIG. 18, those respective components include a control unit, a storage unit, and a transmission/reception unit. The control unit is formed of a central processing unit (CPU) (not shown) or the like being a processing unit of a normal computer or the like. The storage unit is formed of a memory device, for example, a semiconductor storage device or a magnetic storage device. The transmission/reception unit is formed of a network interface for the wired or wireless communications. Each of the components may include a clock or the like as the need arises.

In FIG. 15 to FIG. 18, six kinds of arrows having different shapes respectively indicate the time synchronization, the association, the storage of the acquired sensing data, the analysis of the sensing data, firmware update, and a flow of data or a signal for a control signal.

Figure 18:
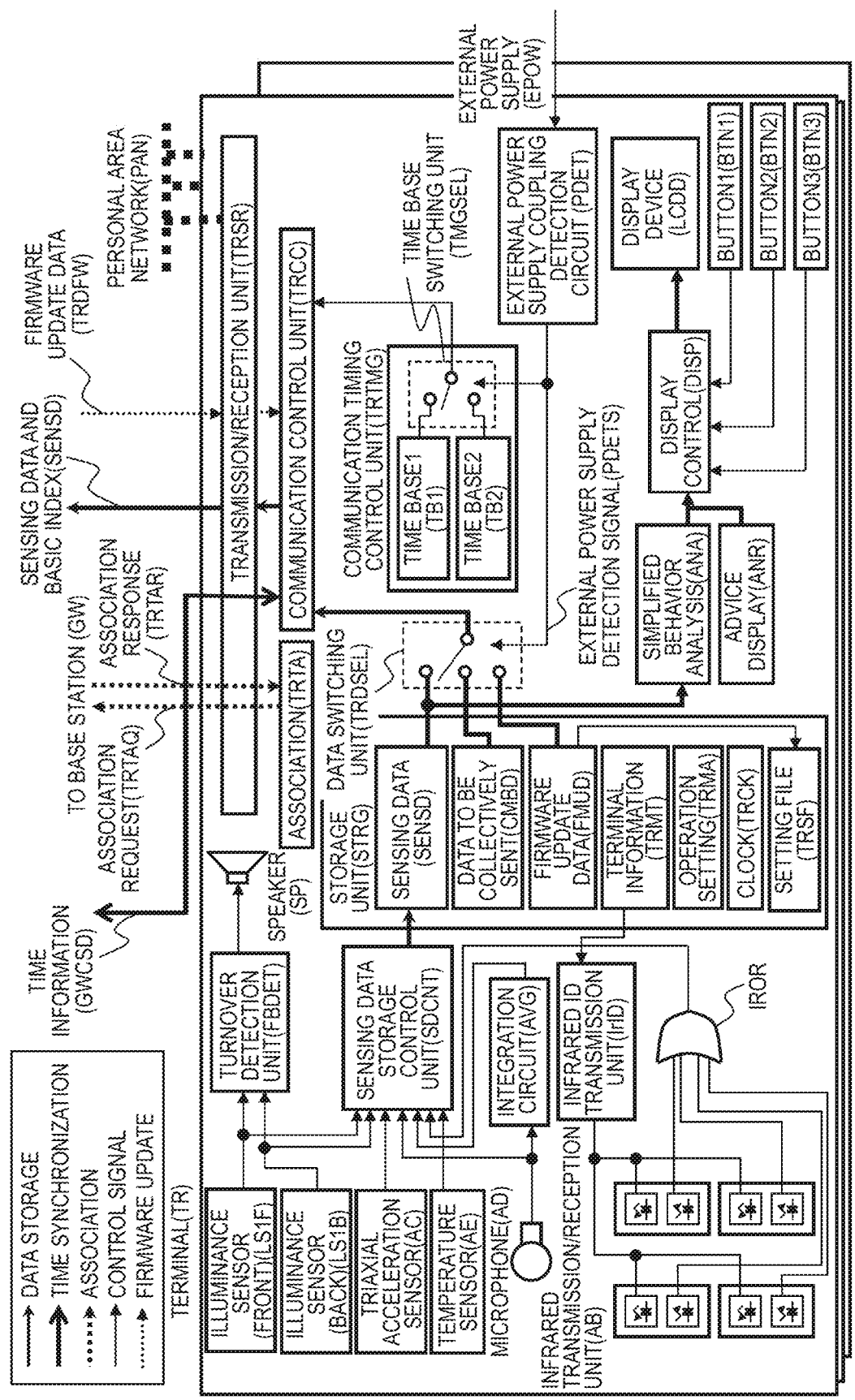
FIG. 18 is a block diagram for illustrating a configuration of the terminal being an example of a sensor node of the embodiment of this invention.

<FIG. 18: Overall System 1 (TR)>

FIG. 18 is a block diagram for illustrating a configuration of the terminal (TR) being an example of a sensor node of the embodiment of this invention.

In this case, the terminal (TR) is assumed to have a shape of a name plate and to be hung from the person's neck, which is merely an example, and may have another shape. In most cases, a plurality of terminals (TR) exist in the above-mentioned series of system, and are respectively worn by a plurality of persons. The terminal (TR) is provided with various sensors including a plurality of infrared transmission/reception units (AB) being a sensor configured to detect a face-to-face situation between humans, the tri-axial acceleration sensor (AC) configured to detect an action of the wearer, a microphone (AD) configured to detect an utterance of the wearer and surrounding sound, illuminance sensors (LS1F and LS1B) configured to detect whether or not the terminal is turned over, and the temperature sensor (AE). The provided sensors are merely examples, and other sensors may be used to detect the face-to-face situation between the wearers and the action of the wearer.

The terminal (TR) of this embodiment is provided with four pairs of infrared transmission/reception units. The infrared transmission/reception unit (AB) continues to periodically transmit the terminal information (TRMT) being identification information unique to the terminal (TR) toward a front direction. When the person wearing another terminal (TR) is positioned substantially in front (for example, in front or obliquely in front), the terminal (TR) and another terminal (TR) exchange their terminal information (TRMT) through infrared rays. Therefore, it can be recorded who faces whom. It is also possible to detect which user (US) has stayed in a given area by causing a position detector (not shown) installed in an external environment and the terminal (TR) to transmit and receive the terminal information (TRMT) and positional information to/from each other.

In general, the infrared transmission/reception units (AB) are each formed of a combination of an infrared-emitting diode for transmission of the infrared rays and an infrared phototransistor. An infrared ID transmission unit (IrID) is configured to generate the terminal information (TRMT) being its own ID, and to transfer the terminal information (TRMT) to the infrared-emitting diodes of the infrared transmission/reception units. In this embodiment, the same data is transmitted to a plurality of infrared transmission/reception modules, to thereby cause all infrared-emitting diodes to simultaneously emit light. It should be understood that the respective infrared-emitting diodes may emit light at separate timings, or different pieces of data may be output.

The data received by the infrared phototransistor of the infrared transmission/reception units (AB) are subjected to logical OR by a logical OR circuit (IROR). In short, when light of an ID is received by at least any one of infrared-receiving units, the light is recognized as the ID by the terminal. It should be understood that a plurality of reception circuits for the ID may be separately provided. In this case, a transmission/reception state can be grasped for each of the infrared transmission/reception modules, and hence it is possible to obtain additional information, for example, a direction in which another terminal involved in the facing is positioned.

Sensing data (SENSD) detected by the sensor is stored in the storage unit (STRG) by a sensing data storage control unit (SDCNT). The sensing data (SENSD) is processed into a transmission packet by a communication control unit (TRCC), and is transmitted to the base station (GW) by a transmission/reception unit (TRSR).

At this time, a communication timing control unit (TRTMG) extracts the sensing data (SENSD) from the storage unit (STRG) and determines a timing of transmission to be conducted in a wireless or wired manner. The communication timing control unit (TRTMG) includes a plurality of time bases (TB1 and TB2) configured to determine a plurality of timings.

The data stored in the storage unit (STRG) includes not only the sensing data (SENSD) detected by the sensor immediately before the storage but also data to be collectively sent (CMBD), which was accumulated in the past, and firmware update data (FMUD) for updating firmware being an operation program of the terminal.

The terminal (TR) of this embodiment causes an external power supply coupling detection circuit (PDET) to detect that the external power supply (EPOW) is coupled to the terminal (TR), and generates an external power supply detection signal (PDETS). A time base switching unit (TMGSEL) configured to switch a transmission timing generated by the communication timing control unit (TRTMG) based on the external power supply detection signal (PDETS) or a data switching unit (TRDSEL) configured to switch data to be exchanged through wireless communications based on the external power supply detection signal (PDETS) have configurations specific to the terminal (TR) of this embodiment. In FIG. 18, as an example, there is illustrated a configuration in which the time base switching unit (TMGSEL) switches the transmission timing between two time bases of a time base 1 (TB1) and a time base (TB2) based on the external power supply detection signal (PDETS). There is also illustrated a configuration in which the data switching unit (TRDSEL) switches the data to be exchanged through communications among the sensing data (SENSD) obtained from the sensor, the data to be collectively sent (CMBD) which was accumulated in the past, and the firmware update data (FMUD) based on the external power supply detection signal (PDETS).

The illuminance sensors (LS1F and LS1B) are provided to a front surface and a back surface, respectively, of the terminal (TR). Pieces of data acquired by the illuminance sensors (LS1F and LS1B) are stored in the storage unit (STRG) by the sensing data storage control unit (SDCNT), and are also compared with each other by a turnover detection unit (FBDET). When the name plate is correctly worn, the illuminance sensor (LS1F) provided to the front surface receives extraneous light, while the illuminance sensor (LS1B) provided to the back surface does not receive extraneous light because of having such a positional relationship as to be sandwiched between a main body of the terminal and the wearer. At this time, an illuminance detected by the illuminance sensor (LS1F) provided to the front surface is larger than an illuminance detected by the illuminance sensor (LS1B) provided to the back surface. Meanwhile, when the terminal (TR) is turned over, the illuminance sensor (LS1B) provided to the back surface receives extraneous light, while the illuminance sensor (LS1F) provided to the front surface is directed toward the wearer side, and hence the illuminance detected by the illuminance sensor (LS1B) is larger than the illuminance detected by the illuminance sensor (LS1F).

In this case, the turnover detection unit (FBDET) can detect whether or not a name plate node is turned over and not correctly worn by comparing the illuminance detected by the illuminance sensor (LS1F) and the illuminance detected by the illuminance sensor (LS1B). When it is detected by the turnover detection unit (FBDET) that the name plate node is turned over, the speaker (SP) emits an alert sound to notify the wearer to that effect.

The microphone (AD) is configured to acquire sound information. With the sound information, it is possible to know a surrounding environment that is, for example, "noisy" or "quiet". In addition, by acquiring and analyzing a voice of a person, it is possible to generate a behavior index relating to face-to-face communication in terms of whether the communication is active or sluggish, whether the person is interactively having a conversation equally with another or is talking one-sidedly, whether the person is angry or is laughing, or the like. In addition, the sound information and the acceleration information can be used to compensate for a face-to-face state that cannot be detected by the infrared transmission/reception unit (AB) due to a position in which the person is standing.

Both a sound waveform and a signal obtained by integrating the sound waveform by an integration circuit (AVG) are acquired from the sound acquired by the microphone (AD). The signal obtained through the integration indicates energy of the acquired sound.

The triaxial acceleration sensor (AC) is configured to detect an acceleration of a node, that is, a movement of the node. Therefore, an intensity of a movement of the person wearing the terminal (TR) and a behavior, for example, walking, can be analyzed from the acceleration data detected by the triaxial acceleration sensor (AC). It is also possible to analyze the activity ratio of the communication among the persons wearing a plurality of terminals, a mutual rhythm, a mutual correlation, and the like by comparing the values of the accelerations detected by those terminals in the same time slot.

In the terminal (TR) of this embodiment, the data acquired by the triaxial acceleration sensor (AC) is stored in the storage unit (STRG) by the sensing data storage control unit (SDCNT).

In the simplified behavior analysis (ANA), a setting file (TRSF) stored in advance in the storage unit (STRG) is read, its program is used to conduct the simplified behavior analysis (ANA), and it is determined whether or not the advice has been carried out. In advice display (ANR), the information on the advice item received from the application server (AS) through the transmission/reception unit (TRSR) is displayed. As a result of the simplified behavior analysis (ANA) and the advice display (ANR), the screen is updated in the display control (DISP), and is again displayed on the display device (LCDD). In addition, display contents may be switched through the pressing of the buttons 1 to 3 (BTN1 to BTN3).

The infrared transmission/reception units (AB) exchange infrared rays between the nodes, to thereby determine whether or not the terminal (TR) faces another terminal (TR), that is, whether or not the person wearing the terminal (TR) faces the person wearing another terminal (TR). Therefore, it is desired that the terminal (TR) is worn on a front portion of the person. As described above, the terminal (TR) further includes the triaxial acceleration sensor (AC) or other such sensor.

In most cases, there exist a plurality of terminals (TR), and when the terminals and the base station are coupled to each other in a wireless manner, the respective terminals (TR) are coupled to a near base station (GW) to form a personal area network (PAN).

The temperature sensor (AE) of the terminal (TR) is configured to acquire a temperature in a place where the terminal exists, and the illuminance sensor (LS1F) is configured to acquire an illuminance in the front direction or the like of the terminal (TR). This allows the surrounding environment to be recorded. For example, it is also possible to know that the terminal (TR) has moved from a given place to another place based on the temperature and the illuminance.

The terminal (TR) includes the buttons 1 to 3 (BTN1 to BTN3), the display device (LCDD), and the speaker (SP) as input/output devices corresponding to the person wearing the terminal (TR).

Specifically, the storage unit (STRG) is formed of a non-volatile storage device, for example, a hard disk drive or a flash memory, and has recorded therein the terminal information (TRMT) being the identification number unique to the terminal (TR), a sensing interval, and an operation setting (TRMA) including contents to be output to the display. In addition, the storage unit (STRG) can have data temporarily recorded therein, and is used to record the data subjected to the sensing.

The clock (TRCK) is a clock configured to hold the time information (GWCSD) and to update the time information (GWCSD) at a fixed interval. The time information (GWCSD) held by the clock (TRCK) is periodically corrected based on the time information (GWCSD) transmitted from the base station (GW) in order to avoid deviating from the time information (GWCSD) held by another terminal (TR).

The sensing data storage control unit (SDCNT) is configured to control the sensing interval or the like of each sensor based on the operation setting (TRMA) recorded in the storage unit (STRG) and to manage the acquired data.

The time synchronization is conducted by the terminal (TR) acquiring the time information from the base station (GW) to correct the clock (TRCK). The time synchronization may be executed immediately after the association described later, or may be executed based on a time synchronization command transmitted from the base station (GW).

The communication control unit (TRCC) is configured to control a transmission interval and convert data into a data format corresponding to wireless transmission and reception when transmitting and receiving the data. The communication control unit (TRCC) may have a function of conducting communications in a wired manner instead of a wireless manner as necessary. The communication control unit (TRCC) may be configured to conduct congestion control so as to inhibit the transmission timing from overlapping with another terminal (TR).

In the association (TRTA), an association request (TRTAQ) to form the personal area network (PAN) and an association response (TRTAR) are transmitted to and received from the base station (GW) to determine the base station (GW) to which data is to be transmitted. The association (TRTA) is executed when the terminal (TR) is powered on and when the previous coupling for transmitting and receiving data to/from the base station (GW) is disconnected as a result of the movement of the terminal (TR). In a case of wired coupling, the association (TRTA) is executed when it is detected that the terminal (TR) has been coupled to the base station (GW) in a wired manner. As a result of the association (TRTA), the terminal (TR) is associated with one base station (GW) existing within such a close range that the radio signal from the terminal (TR) reaches the base station (GW).

The transmission/reception unit (TRSR) includes an antenna, and is configured to transmit and receive a radio signal. As the need arises, the transmission/reception unit (TRSR) can transmit and receive a signal through use of a connector for wired communications. The sensing data and a basic index (SENSD) transmitted and received by the transmission/reception unit (TRSR) are transferred to the base station (GW) through the personal area network (PAN).

Figure 17:
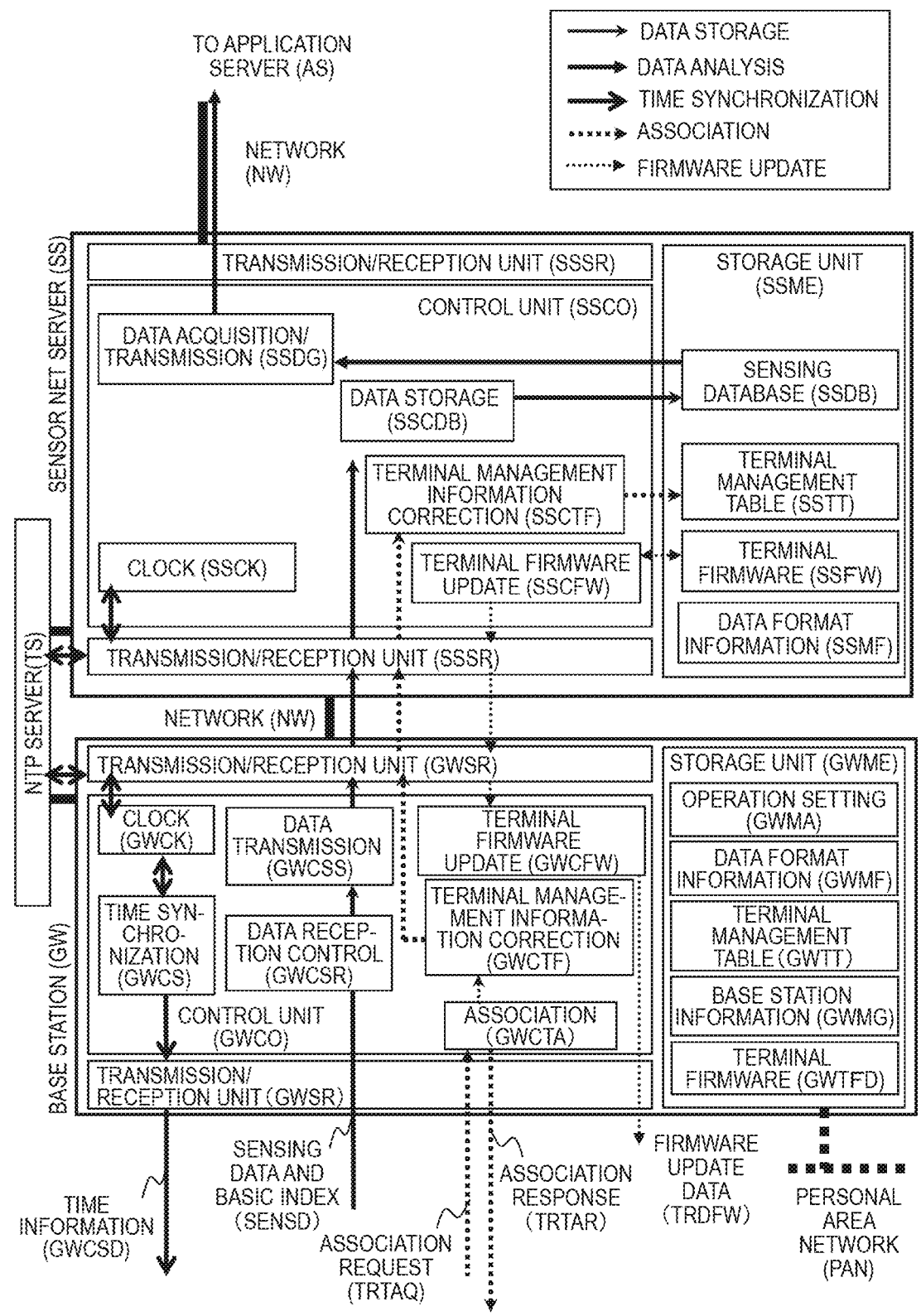
FIG. 17 is a block diagram for illustrating an example of configurations of a sensor net server and a base station of the embodiment of this invention.

<FIG. 17: Overall System 2 (GW, SS)>

FIG. 17 is a block diagram for illustrating an example of configurations of the sensor net server (SS) and the base station (GW) of the embodiment of this invention.

<Base Station (GW)>

The base station (GW) plays a role of mediating between the terminal (TR) and the sensor net server (SS). When the terminal (TR) and the base station (GW) are coupled to each other in a wireless manner, a plurality of base stations (GW) are arranged so as to cover an area, for example, a living room or a workplace, in consideration of a wireless range. In the case of the wired coupling, a limit to the number of the terminals (TR) to be managed is set depending on a throughput of the base station (GW).

The base station (GW) includes a transmission/reception unit (GWSR), a storage unit (GWME), and a control unit (GWCO).

The transmission/reception unit (GWSR) is configured to receive data from the terminal (TR) in a wireless or wired manner, and to transmit data to the sensor net server (SS) in a wireless or wired manner. When the transmission and reception are conducted in a wireless manner, the transmission/reception unit (GWSR) includes the antenna in order to receive a radio signal. The transmission/reception unit (GWSR) is further configured to conduct the congestion control, that is, communication timing control, as necessary so as to prevent data loss when transmitting or receiving the sensing data. The transmission/reception unit (GWSR) is further configured to distinguish the kind of received data. Specifically, the transmission/reception unit (GWSR) is configured to identify whether or not the received data is general sensing data, whether or not the data is data for the association, whether or not the data is a response for the time synchronization, and the like from a header part of the data, and to pass the data to each of the functions suitable for the data.

The storage unit (GWME) is formed of a hard disk drive, a memory, or an external recording device (not shown), for example, an SD card. The storage unit (GWME) stores an operation setting (GWMA), the data format information (GWMF), a terminal management table (GWTT), the base station information (GWMG), and terminal firmware (GWTFD). The operation setting (GWMA) includes information for indicating a method of operating the base station (GW). The data format information (GWMF) includes information for indicating a data format for communications and information necessary to add a tag to the sensing data. The terminal management table (GWTT) includes the terminal information (TRMT) on currently associated terminals (TR) under the management and local IDs distributed to manage those terminals (TR). The terminal management table (GWTT) may be omitted when the base station (GW) is coupled to the terminal (TR) in a wired manner without the need to constantly grasp the terminals (TR) under the management. The base station information (GWMG) includes information such as an address of the base station (GW) itself. The terminal firmware (GWTFD) stores a program for operating the terminal, and is configured to transmit firmware update data (TRDFW) to the terminal (TR) through the personal area network (PAN) when receiving an instruction and new terminal firmware from the sensor net server (SS) (GWCFW). The storage unit (GWME) may further store a program to be executed by a CPU (not shown) of the control unit (GWCO).

The control unit (GWCO) includes the CPU (not shown). The CPU is configured to execute the program stored in the storage unit (GWME), to thereby manage a timing to receive the sensing data from the terminal (TR), processing for the sensing data, a timing for transmission to or reception from the terminal (TR) or the sensor net server (SS), and a timing for the time synchronization. Specifically, the control unit (GWCO) is configured to execute processing including data reception control (GWCSR), data transmission (GWCSS), association (GWCTA), terminal management information correction (GWCTF), terminal firmware update (GWCFW), and time synchronization (GWCS).

A clock (GWCK) is configured to hold the time information. The time information is updated at a fixed interval. Specifically, the time information of the clock (GWCK) is corrected based on the time information acquired from the NTP server (TS) at the fixed interval.

In the time synchronization (GWCS), the time information to the terminal (TR) under the management is transmitted at the fixed interval or with a trigger that the terminal (TR) is coupled to the base station (GW). With this processing, the time of the clock (TRCK) of each of a plurality of terminals (TR) and the time of the clock (GWCK) of the base station (GW) are synchronized with each other.

In the association (GWCTA), the association response (TRTAR) for transmitting the assigned local ID to each of the terminals (TR) in response to the association request (TRTAQ) transmitted from the terminal (TR) is conducted. When the association is established, the association (GW-CTA) is followed by the terminal management information correction (GWCTF) for correcting the terminal management table (GWTT).

In the data reception control (GWCSR), a packet of the sensing data (SENSD) transmitted from the terminal (TR) is received. In the data reception control (GWCSR), the header of the received packet of the data is read to identify the kind of data and to conduct the congestion control so as to prevent data from being transmitted simultaneously in a concentrated manner from a large number of terminals (TR).

In the data transmission (GWCSS), an ID of the base station through which data has passed and time data on the passage are added to transmit the sensing data to the sensor net server (SS).

<Sensor Net Server (SS)>

The sensor net server (SS) includes a transmission/reception unit (SSSR), a storage unit (SSME), and a control unit (SSCO).

The sensor net server (SS) is configured to manage the data collected from all the terminals (TR). Specifically, the sensor net server (SS) is configured to store the sensing data transmitted from the base station (GW) in the sensing database (SSDB) (SSCDB). The sensor net server (SS) is further configured to search the sensing database (SSDB) for data based on a request received from the application server (AS), and to transmit the data to the application server (AS) (SSDG).

In addition, the sensor net server (SS) is configured to manage information on the base station (GW) and the terminal (TR) under the management of the base station (GW) as the need arises. The sensor net server (SS) serves as a starting point of a control command to update the firmware of the terminal (TR).

The transmission/reception unit (SSSR) is configured to transmit and receive data to/from the base station (GW), the application server (AS), a personal client (CP), and the client (CL), and to control communications for the transmission and reception.

The storage unit (SSME) is formed of a data storage device, for example, a hard disk drive, and stores at least the sensing database (SSDB), the data format information (SSMF), a terminal management table (SSTT), and terminal firmware (SSFW). In addition, the storage unit (SSME) stores a program to be executed by a CPU (not shown) of the control unit (SSCO).

The sensing database (SSDB) is a database for recording the sensing data acquired by each terminal (TR), the information on the terminal (TR), the information on the base station (GW) through which the sensing data transmitted from each terminal (TR) has passed, and the like. The data is managed by creating columns for respective elements of data, for example, an acceleration and a temperature. A table may be created for each of the elements of data. In any one of the above-mentioned cases, all pieces of data are managed in association with the acquired terminal information (TRMT) being an ID of the terminal (TR) and information relating to the time at which the data was obtained through the sensing.

The data format information (SSMF) has recorded therein the data format for communications, a method of recording the sensing data given a tag by the base station (GW) in the database through segmentation of the sensing data, information for indicating a method of handling a request for data, and the like. After data reception, the data format information (SSMF) is referred to before the data transmission, and data format conversion and data sorting are conducted.

The terminal management table (SSTT) is a table for recording which terminal (TR) is currently under the management of which base station (GW). When the terminal (TR) is newly added under the management of the base station (GW), the terminal management table (SSTT) is updated. When the base station (GW) and the terminal (TR) are coupled to each other in a wired manner, it suffices that terminal management information is not constantly monitored.

The terminal firmware (SSFW) stores a program for operating the terminal (TR). When terminal firmware update (SSCFW) is conducted, the terminal firmware (SSFW) is updated, transmitted to the base station (GW) through the network (NW), and further transmitted to the terminal (TR) through the personal area network (PAN), and the firmware within the terminal (TR) is updated (FMUD).

The control unit (SSCO) includes the CPU (not shown), and is configured to control the transmission and reception of the sensing data and the recording and extraction of data to/from the database. Specifically, the CPU is configured to execute the program stored in the storage unit (SSME), to thereby execute processing including the data storage (SSCDB), terminal management information correction (SSCTF), the terminal firmware update (SSCFW), and the data acquisition/transmission (SSDG).

The data storage (SSCDB) is processing for receiving the sensing data transmitted from the base station (GW), and storing the sensing data in the sensing database (SSDB). The sensing data is stored in the database as one record along with additional information including the time information, the terminal ID, and the time at which the sensing data passed through the base station.

A clock (SSCK) is configured to regularly establish coupling with the external NTP server (TS), to thereby hold a standard time. When a time designated by the clock (SSCK) in advance is reached or when a specific condition is satisfied, sensing data processing (SSCDT) is timer-started (not shown).

In the terminal management information correction (SSCTF), the terminal management table (SSTT) is updated when receiving a command to correct the terminal management information from the base station (GW). The terminal management information correction (SSCTF) serves to constantly grasp the list of the terminals (TR) under the management of each base station (GW).

In the terminal firmware update (SSCFW), the terminal firmware (SSFW) within the storage unit (SSME) is updated when the need to manually or automatically update the firmware of the terminal (TR) arises, and an instruction to update the firmware of the terminal (TR) under the management is issued to the base station (GW). The terminal firmware update (SSCFW) is continued until a response indicating that the firmware update has been completed on each terminal (TR) is received and the update for all the terminals (TR) is completed.

Figure 16:
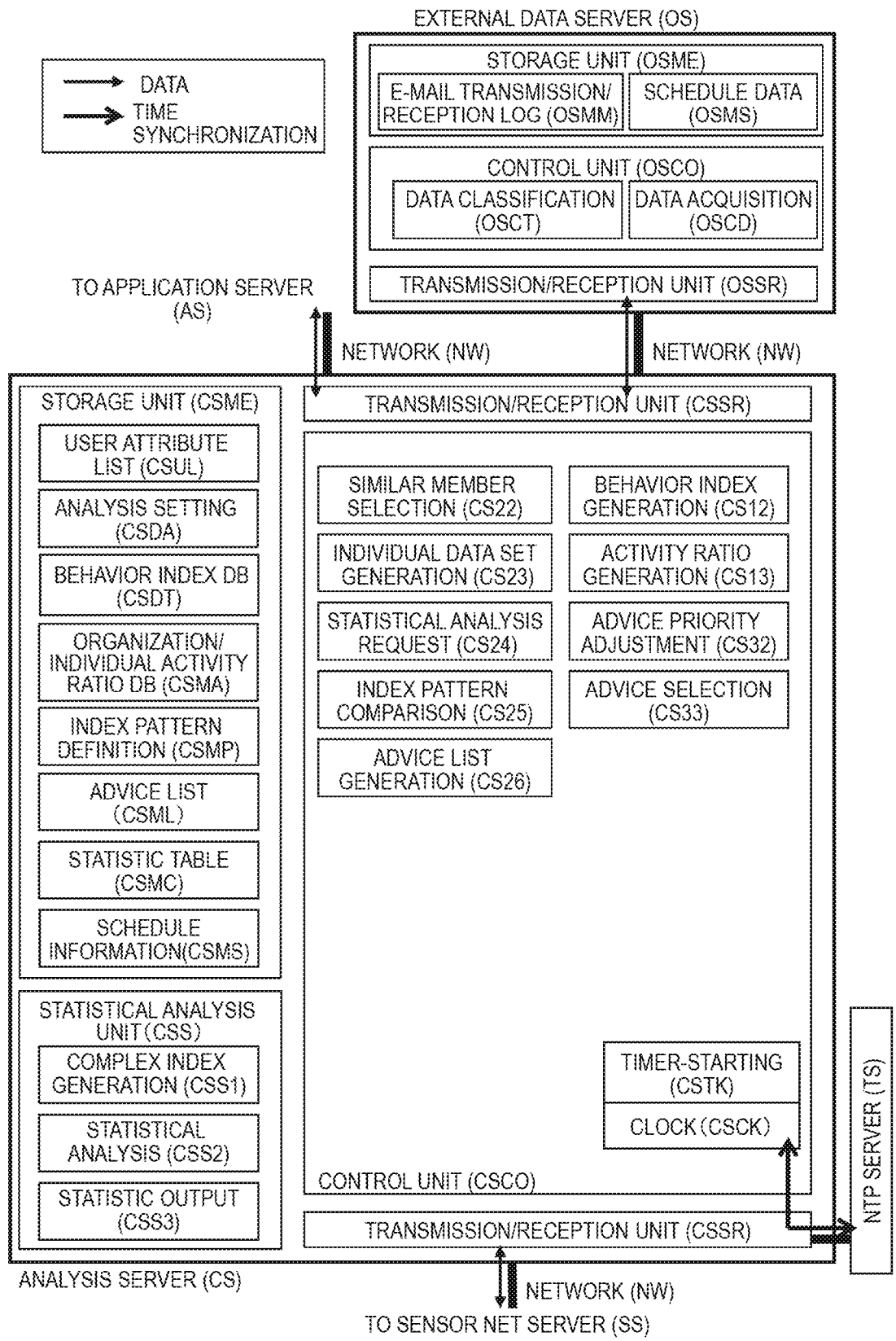
FIG. 16 is a block diagram for illustrating an example of configurations of the analysis server and an external data server of the embodiment of this invention.

<FIG. 16: Overall System 3 (CS, OS)>

FIG. 16 is a block diagram for illustrating an example of configurations of the analysis server (CS) and the external data server (OS) of the embodiment of this invention.

<Analysis Server (CS)>

The analysis server (CS) is configured to conduct statistical analysis between the behavior index and the organization index to generate advice for each individual.

The analysis server (CS) includes a transmission/reception unit (CSSR), the storage unit (CSME), and a control unit (CSCO).

The transmission/reception unit (CSSR) is configured to transmit and receive data to/from the sensor net server (SS), the NTP server (TS), the application server (AS), the client (CL), the external data server (OS), and the like through the network (NW), and to control communications for the transmission and the reception.

The storage unit (CSME) is formed of a hard disk drive, a memory, or an external recording device, for example, an SD card. The storage unit (CSME) stores created content information, a program for content creation, and other data relating to the content creation. Specifically, the storage unit (CSME) stores a user attribute list (CSUL), the analysis setting (CSDA), the behavior index DB (CSDT) for accumulating the behavior indices, the organization/individual activity ratio DB (CSMA) for storing an evaluation index to be the organization index or the object variable, the index pattern definition (CSMP), an advice list (CSML) being a DB for storing the advice list, the statistic table (CSMC) for storing the statistic, scheduling information (CSMS) being a DB for storing the schedule information and the like acquired from the external data server (OS), and the like.

The user attribute list (CSUL) is a comparative list between the ID of the terminal (TR) and a name and a user ID of the user (US) wearing the terminal, a department to which the user (US) belongs, an e-mail address, and other such attribute. The user attribute list (CSUL) is referred to when an ID received from the opposite party of persons who face each other is associated with the name, when the organization index is summarized for each of the departments to which the users (US) belong, and when the display content is changed based on an ID used to log in to a website.

The control unit (CSCO) includes a CPU (not shown), and is configured to execute processes including index generation. The analysis server (CS) further includes a clock (CSCK), and is coupled to the external NTP server (TS) or the like to maintain a precise time. When a time set for each program is reached, the analysis server (CS) is timer-started (CSTK), and the program within the control unit (CSCO) is executed. The program may be started manually, may be started when an instruction is received from the client (CL), or may be started with a trigger that the index transmitted from the sensor net server (SS) exhibits a specific pattern. The control unit (CSCO) is configured to conduct various kinds of processing relating to the index generation and the advice generation. Specifically, the control unit (CSCO) is configured to conduct the similar member selection (CS22), the individual data set generation (CS23), the statistical analysis request (CS24), the index pattern comparison (CS25), the advice list generation (CS26), the behavior index generation (CS12), the activity ratio generation (CS13), the advice priority adjustment (CS32), the advice selection (CS33), and the like.

The analysis server (CS) further includes the statistical analysis unit (CSS). The statistical analysis unit (CSS) may be provided on another external server (not shown) to transmit and receive data to/from the analysis server (CS) through the transmission/reception unit (CSSR), or may be provided inside the control unit (CSCO). The statistical analysis unit (CSS) has a function of conducting the statistical analysis for the input data set, which includes the complex index generation (CSS1) based on the data set, the statistical analysis (CSS2) between the object variable and each of the explanatory variables, and the statistic output (CSS3) for outputting the statistic of a result of the statistical analysis (CSS2).

<External Data Server (OS)>

The external data server (OS) is a server configured to hold the e-mail transmission/reception log (OSMM) for the users (US), the schedule data (OSMS) on the scheduler, and data that cannot be acquired by the terminal (TR), for example, management indices. The external data server (OS) is coupled to the analysis server (CS) through the transmission/reception unit (OSSR) to conduct the data acquisition (OSCD) when receiving a request for data. In that case, the external data server (OS) may cause the control unit (OSCO) to conduct the data classification (OSCT) by classifying the data stored in the storage unit (OSME), for example, by extracting only information including a specific keyword, and then transmit the classified data to the analysis server (CS). The data may not only be exchanged online but also be output to a CD-R or an HDD to be manually exchanged with the analysis server (CS).

Figure 15:
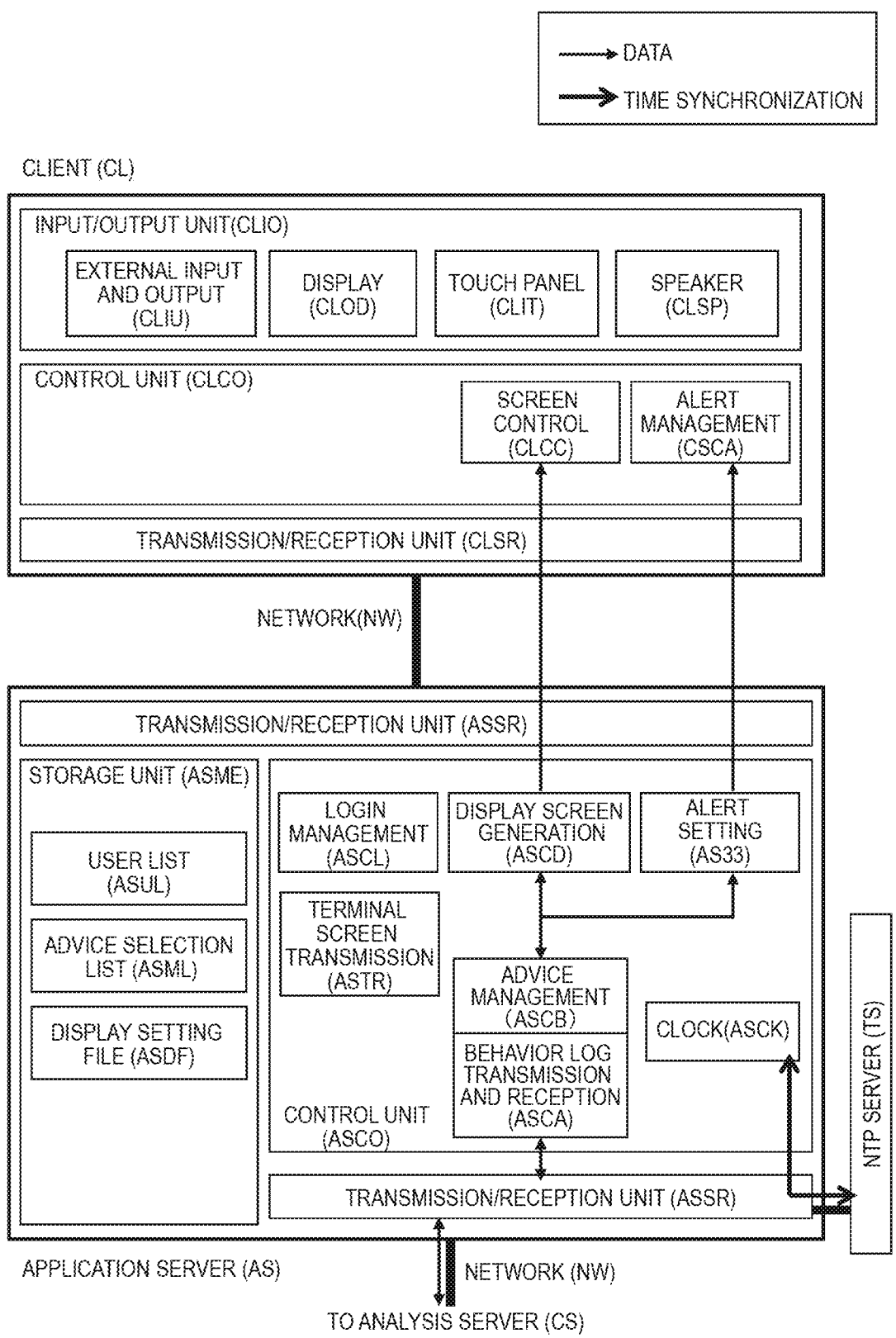
FIG. 15 is a block diagram for illustrating an example of configurations of an application server and the client of the embodiment of this invention.

<FIG. 15: Overall System 4 (AS, CL)>

FIG. 15 is a block diagram for illustrating an example of configurations of the application server (AS) and the client (CL) of the embodiment of this invention.

<Application Server (AS)>

The application server (AS) includes a transmission/reception unit (ASSR), the storage unit (ASME), and a control unit (ASCO), and is configured to conduct the display screen generation (ASCD) for the screen control (CLCC) conducted for presenting the advice and the behavior log to the user (US) and allowing the user (US) to operate the screen.

The transmission/reception unit (ASSR) is configured to transmit and receive data to/from the sensor net server (SS), the analysis server (CS), the NTP server (TS), the client (CL), and the external data server (OS), and the like through the network (NW), and to control communications for the transmission and the reception.

The storage unit (ASME) is formed of a hard disk drive, a memory, or an external recording device, for example, an SD card. The storage unit (ASME) stores an image for forming the screen, a user list (ASUL) used to conduct login management (ASCL), a program for generating and controlling a user interface, the display setting file (ASDF) for holding a display setting, the advice selection list (ASML) for storing the advice selected on the screen by the user, and the like.

The control unit (ASCO) includes a CPU (not shown), and is configured to execute processes including combination of behavior logs to be used for display and the display screen generation (ASCD). The application server (AS) further includes a clock (ASCK), and is coupled to the external NTP server (TS) or the like to maintain a precise time. When a time set for each program is reached, the application server (AS) is timer-started (ASST), and the program is executed by the control unit (ASCO). The program may be started manually, may be started when an instruction is received from the client (CL), or may be started with a trigger that the index transmitted from the analysis server (CS) exhibits a specific pattern. In a case where a time to present an alert is determined in advance based on the contents of the advice, an instruction may be issued to output the alert to the display (CLOD), the display device (LCDD), or the speaker (CLSP) (SP) of the client (CL) or the terminal (TR) when the time of the clock (ASCK) reaches a predetermined time.

The application server (AS) is configured to receive the behavior log and the advice list from the analysis server (CS) (ASCA), to select a predetermined piece of advice based on the display setting file (ASDF) (ASCB), and to generate the display screen in which those pieces of data are reflected (ASCD). The application server (AS) is further configured to set the time at which an alert is output and means for outputting the alert based on the content of the advice, and to transmit the time and the means to the client (CL) (AS33). In the same manner, the application server (AS) may be configured to transmit character and image information to be displayed on the display device (LCDD) and an instruction for the timing for the display to the terminal (TR) so as to display the advice and the track record value on the terminal (TR) (ASTR).

The application server (AS) is further configured to manage the user (US) viewing through the client (CL) in the login management (ASCL), and to conduct an inquiry for a password, a setting of a right to view based on the department to which the user (US) belongs, and the like.

In the display screen generation (ASCD), the data obtained from the analysis server (CS) is processed, and the screens exemplified in FIG. 2 to FIG. 9 are generated and transmitted to the client (CL). In the display screen generation (ASCD), the display screen control for switching and updating the display screen is conducted in conjunction with the screen control (CLCC) for the client by following the action of the user (US) through the client (CL).

<Client (CL)>

The client (CL) is configured to present necessary information to the user (US) in the form of images or sound as a point of contact with the user (US). The client (CL) includes an input/output unit (CLIO), a transmission/reception unit (CLSR), a storage unit (not shown), and a control unit (CLCO).

The input/output unit (CLIO) is a section serving as an interface to the user (US). The input/output unit (CLIO) includes the display (CLOD), a touch panel (CLIT), the speaker (CLSP), a keyboard (not shown), and a mouse (not shown). Another input/output device (not shown) may be coupled to external input and output (CLIU) as necessary.

The display (CLOD) is an image display device, for example, a cathode-ray tube (CRT) or a liquid crystal display. The display (CLOD) may include a printer. When the touch panel (CLIT) is used to assist the user in inputting operation, the outputting and the inputting can also be conducted through the same screen.

The transmission/reception unit (CLSR) is configured to transmit and receive data and instructions to/from the application server (AS) or another apparatus coupled to the network. Specifically, the transmission/reception unit (CLSR) is configured to transmit a request for the screen to be displayed to the application server (AS), and to receive an image corresponding to the request.

The storage unit (not shown) is formed of a hard disk drive, a memory, or an external recording device, for example, an SD card. The storage unit (not shown) may store a history of the display screen, a login ID of the user (US), and the like.

The control unit (CLCO) includes the CPU (not shown), and is configured to conduct the screen control (CLCC) for controlling the screen to be output to the display (CLOD) or the like, and to manage the timing to output an alert and a method of outputting the alert based on the alert setting (AS33) informed by the application server (AS) (CSCA).

Figure 24:
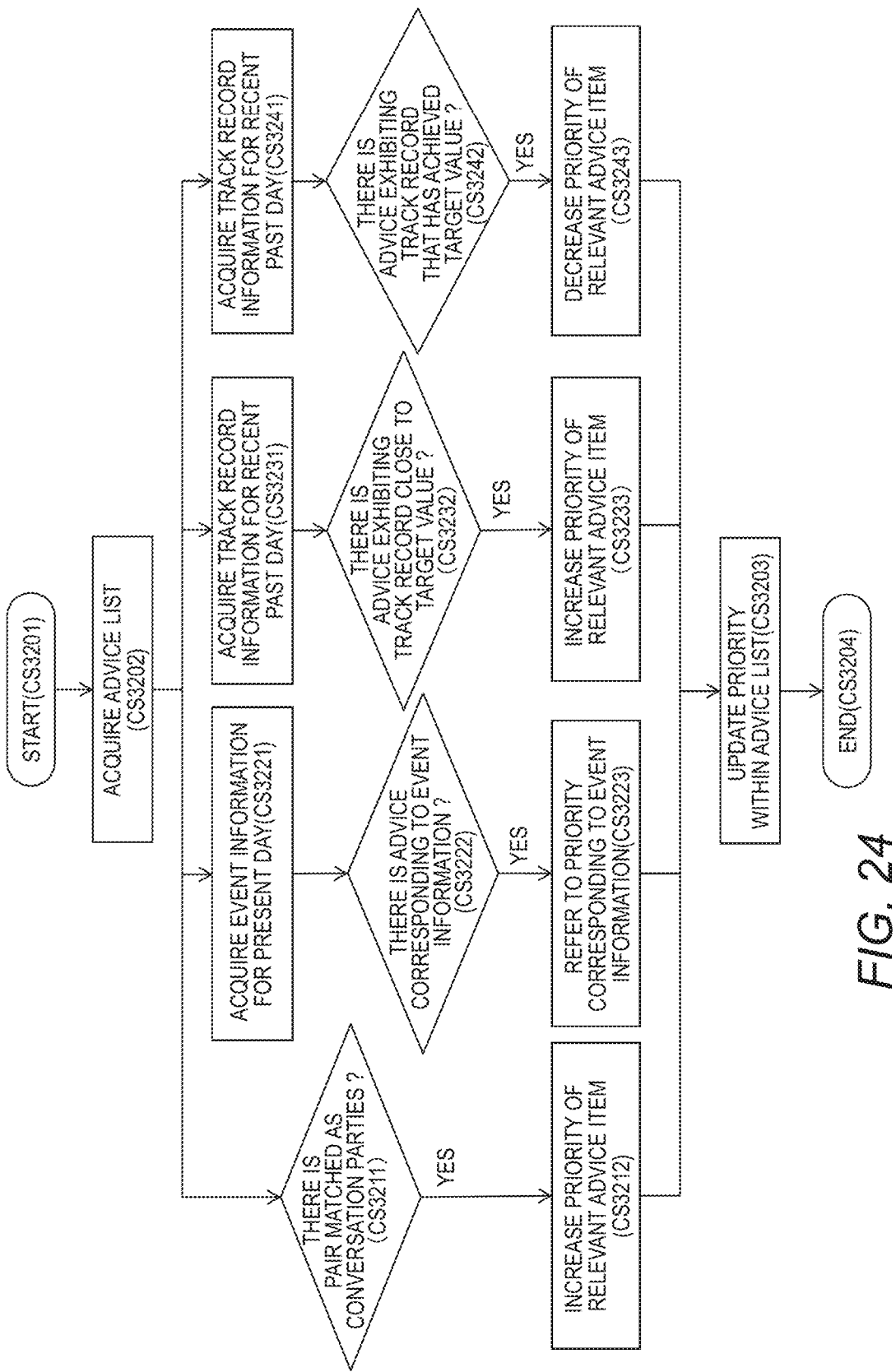
FIG. 24 is a flowchart for illustrating processing for adjusting a priority of advice by the analysis server of the embodiment of this invention.

<FIG. 24: Advice Priority Adjustment (CS32)>

FIG. 24 is a flowchart for illustrating processing for adjusting the priority of advice by the analysis server (CS) of the embodiment of this invention.

Specifically, the processing of FIG. 24 is executed in the advice priority adjustment (CS32) illustrated in FIG. 14. According to this processing, it is possible to preferentially present a piece of advice that is likely to be executed by the relevant user (US) (that is, subject user of the advice) on the relevant day (that is, subject day of the advice), and to enhance the possibility of modifying his/her behavior.

After the start of the processing (CS3201), the analysis server (CS) acquires the advice list generated in the processing (CS26) from the storage unit (CSME) (CS3202). At this time, the analysis server (CS) narrows down the pieces of advice to be acquired by using the subject party ID (MLA1) (MLB1) as a key, and hence it is necessary to acquire the advice list corresponding to each of a plurality of subject party IDs when the processing (CS3211) is conducted.

Subsequently, the analysis server (CS) executes at least one of the following four processing flows.

The first processing flow is a method of finding a pair matched as conversation parties (CS3211). When the advice list A (CSML_A) includes a pair matched as a combination of the subject party ID (MLA1) and the opposite party ID (MLA2) (for example, the advice list of a person A includes the advice to increase the conversation with a person B and the advice list of the person B includes the advice to increase the conversation with the person A), the analysis server (CS) increases the priorities of the relevant advice items for both the persons (CS3212). This facilitates the presenting of the advice to increase the conversation between the subject person and the opposite party. Therefore, their own interests match each other, and the relevant advice can easily be followed. As a method of increasing the value of the priority, the value of the priority may be set to a value higher than that of any other advice item, or a constant may be added to the value of the priority.

The second processing flow is a method of selecting the priority corresponding to the event for the relevant day. The analysis server (CS) acquires the event information of the present day or the following day from the event table (CSDTI) held by the storage unit (CSME) or the external data server (OS), and refers to the priority of the advice having equivalent event information as the condition in the advice list (CSML) (CS3221). For example, when the advice list (CSML) includes a priority having no limitation on the day of the week and a priority for each day of the week as the priority of the advice to do the desk work in the morning, and when the priority on the day of the week of the present day is higher than the priority having no limitation on the day of the week, the former is referred to. In the same manner, when the advice list includes the priority on the day of leaving the office on time and the priority on the day of the drinking party, and when those events are scheduled (or have already been performed) on the subject day of the advice, those priorities are referred to. According to this processing, when there is a high correlation between a specific behavior performed on a day involving a specific event and the organization activity ratio, it is possible to present a piece of advice effective for increasing the organization activity ratio in consideration of the above-mentioned correlation.

The third processing flow is a method of prioritizing the advice that appears to be easily carried out. The analysis server (CS) acquires track record information for a recent past day (for example, one week before the present day or other such predetermined period in the past) from the storage unit (CSME) (CS3231), searches the pieces of advice for the advice item having the target value and the track record value close to each other (that is, the track record value has not reached the target value but a closeness between both satisfies a predetermined condition) (CS3232), and increases the priority of the retrieved advice item (CS3233).

The fourth processing flow is a method of decreasing the priority of the advice that has been carried out in order to prevent the user from feeling bored when the pieces of advice that are easy to carry out are always presented. The analysis server (CS) acquires the track record information for the recent past day from the storage unit (CSME) (CS3241), searches for the advice item having the track record value that has reached the target value (CS3242), and decreases the priority of the retrieved advice item (CS3243).

By the above-mentioned method, the priority (MLA3) (MLB5) within the advice list is updated to the adjusted priority (CS3203) and stored (CS3204).

In a case where the advice list includes a large number of pieces of advice, even when all those pieces of advice are displayed for the user, it is difficult for the user to follow all those pieces of advice. However, for example, by selecting and displaying a predetermined number (six in the example of FIG. 4) of pieces of advice in descending order of the priority, it is possible to display a practically executable number of pieces of advice to promote the behavior particularly considered to have a high contribution degree to the organization activity ratio. Further, as described above, by referring to the priority corresponding to an event and changing the priority depending on a condition, it is possible to display the advice that can easily be followed, and as a result, the organization activity ratio can be expected to improve.

The embodiment of this invention has been described above, but it is apparent to those skilled in the art that this invention is not limited to the above-mentioned embodiment, may be modified and embodied in various ways, and the above-mentioned embodiments may be properly combined.

This invention is not limited to the embodiment described above, and encompasses various modification examples. For example, the embodiment has described this invention in detail for the ease of understanding, and this invention is not necessarily limited to a mode that includes all of the configurations described above.

Further, a part or all of the above-mentioned respective configurations, functions, processing units, processing means, and the like may be implemented by hardware through design using, for example, an integrated circuit. Further, the above-mentioned respective configurations, functions, and the like may be implemented by software by the processor interpreting and executing the programs for implementing the respective functions. The programs, the tables, the files, and other such information for implementing the respective functions may be stored in a storage device, for example, a non-volatile semiconductor memory, a hard disk drive, or a solid state drive (SSD), or a non-transitory computer-readable data storage medium, for example, an IC card, an SD card, or a DVD.

Further, the illustrated control lines and information lines are assumed to be necessary for the sake of description, and not all the control lines and information lines of a product are illustrated. It should be understood that almost all the configurations are coupled to one another in practical use.

What is claimed is:

1. A sensor data analysis system, comprising:
a plurality of terminals;
a control unit;
an analysis unit; and
a storage unit, wherein:
the plurality of terminals are each worn on each of a plurality of persons belonging to an organization, the plurality of terminals each comprising at least one sensor configured to measure a physical quantity;
the storage unit is configured to:
hold an index relating to an activated state of the organization; and
hold, for each of a plurality of first conditions relating to a behavior of each of the plurality of persons, a piece of advice corresponding to a statistical relation between an amount of the behavior satisfying the each of the plurality of first conditions and the index relating to the activated state of the organization;
the control unit is configured to generate a behavior index for indicating a behavior of a first person among the plurality of persons based on the physical quantity measured by the at least one sensor of one of the plurality of terminals worn on the first person wherein the behavior index includes for the first person, one or more of an office arrival time, an office leaving time, a total conversation time per day, or a total desk work time per day;
the analysis unit is configured to calculate, for each of the plurality of first conditions, the statistical relation between the amount of the behavior satisfying the each of the plurality of first conditions and the index relating to the activated state of the organization based on the behavior index; and
the control unit is configured to output a piece of advice corresponding to the statistical relation satisfying a second condition.

2. The sensor data analysis system according to claim 1, wherein:
the at least one sensor comprise a transmission/reception unit for a signal comprising identification information on each of the plurality of terminals;
the behavior index comprises information for indicating that the first person and another person face each other, which is generated based on a result of receiving the signal;
the statistical relation between the amount of the behavior satisfying the each of the plurality of first conditions and the index relating to the activated state of the organization comprises a correlation between an amount of a face-to-face state between the first person and another person and the index relating to the activated state of the organization; and
the control unit is configured to determine that the statistical relation satisfies the second condition when a strength of the correlation exceeds a predetermined strength.

3. The sensor data analysis system according to claim 2, wherein:
the at least one sensor comprise an acceleration sensor;
the behavior index comprises information for indicating a conversation between the first person and another person, which is generated based on the result of receiving the signal and a measurement result of the acceleration sensor;
the statistical relation between the amount of the behavior satisfying the each of the plurality of first conditions and the index relating to the activated state of the organization comprises a correlation between an amount of the conversation between the first person and the another person and the index relating to the activated state of the organization; and the control unit is configured to determine that the statistical relation satisfies the second condition when the strength of the correlation exceeds the predetermined strength.

4. The sensor data analysis system according to claim 3, wherein:

the amount of the conversation between the first person and the another person comprises at least one of a number of times of the conversation between the first person and the another person or a time period for the conversation between the first person and the another person;

the plurality of first conditions comprise a condition relating to one of or a combination of two or more of: a conversation party of the first person, a time slot in which the conversation took place, a duration of the conversation, a place where the conversation took place, a number of participants in the conversation, and directivity of the conversation; and pieces of advice held by the storage unit comprise:
a piece of advice to promote an increase of the amount of the behavior satisfying the each of the plurality of first conditions as a piece of advice corresponding to a positive correlation between the amount of the behavior satisfying the each of the plurality of first conditions and the index relating to the activated state of the organization; and a piece of advice to promote a decrease of the amount of the behavior satisfying the each of the plurality of first conditions as a piece of advice corresponding to a negative correlation between the amount of the behavior satisfying the each of the plurality of first conditions and the index relating to the activated state of the organization.

5. The sensor data analysis system according to claim 3, wherein:

the behavior index comprises information for indicating a predetermined task performed by the first person, which is generated based on the measurement result of the acceleration sensor; and the statistical relation between the amount of the behavior satisfying the each of the plurality of first conditions and the index relating to the activated state of the organization comprises a correlation between an amount of the predetermined task and the index relating to the activated state of the organization.

6. The sensor data analysis system according to claim 3, wherein:

the behavior index comprises information for indicating a time distribution of a task of the first person, which is generated based on the measurement result of the acceleration sensor; and the statistical relation between the amount of the behavior satisfying the each of the plurality of first conditions and the index relating to the activated state of the organization comprises a correlation between the time distribution of the task and the index relating to the activated state of the organization.

7. The sensor data analysis system according to claim 3, wherein the control unit is configured to:

calculate the amount of the behavior corresponding to the output piece of advice, which was actually performed by the first person, based on the behavior index; and output a result of the calculation.

8. The sensor data analysis system according to claim 3, wherein the control unit is configured to:

add a priority corresponding to the strength of the correlation to a piece of advice corresponding to each of the plurality of statistical relations satisfying the second condition; and output a predetermined number of pieces of advice having a high priority.

9. The sensor data analysis system according to claim 8, wherein the control unit is configured to:

calculate a target value of the amount of the behavior satisfying the each of the plurality of first conditions based on a track record of the behavior satisfying the each of the plurality of first conditions; and output the target value corresponding to the predetermined number of pieces of advice having a high priority.

10. The sensor data analysis system according to claim 9, wherein the control unit is configured to:

conduct such a change as to increase a priority of a piece of advice corresponding to a correlation between the amount of the behavior satisfying the each of the plurality of first conditions and the index relating to the activated state of the organization when the track record of the behavior satisfying the each of the plurality of first conditions in a past predetermined period has not reached the target value of the amount of the behavior satisfying the each of the plurality of first conditions and when a closeness between the track record of the behavior satisfying the each of the plurality of first conditions in the predetermined period and the target value of the amount of the behavior satisfying the each of the plurality of first conditions falls within a predetermined reference; and conduct such a change as to decrease the priority of the piece of advice corresponding to the correlation between the amount of the behavior satisfying the each of the plurality of first conditions and the index relating to the activated state of the organization when the track record of the behavior satisfying the each of the plurality of first conditions in the past predetermined period has reached the target value of the amount of the behavior satisfying the each of the plurality of first conditions.

11. The sensor data analysis system according to claim 8, wherein the analysis unit is configured to conduct, when a strength of a correlation between an amount of a conversation between the first person and a second person among the plurality of persons belonging to the organization and the index relating to the activated state of the organization exceeds a predetermined strength, such a change as to increase a priority of a piece of advice corresponding to the correlation between the amount of the conversation and the index relating to the activated state of the organization for the first person and the second person.

12. The sensor data analysis system according to claim 8, wherein:

the storage unit is configured to hold information for indicating an event for each day regarding the first person;

the plurality of first conditions comprise a condition relating to the event; and the control unit is configured to refer to a priority corresponding to the each of the plurality of first conditions comprising the event for a subject day of a piece of advice.

13. The sensor data analysis system according to claim 3, wherein:
the control unit is configured to select one of: one or more of the plurality of persons that has a similar behavior pattern to the first person; and one or more of the plurality of persons that had a conversation with the first person for a time period exceeding a predetermined reference, as a similar member from among the plurality of persons belonging to the organization excluding the first person; and
the analysis unit is configured to calculate, for each of the plurality of first conditions, the statistical relation between the amount of the behavior satisfying the each of the plurality of first conditions and the index relating to the activated state of the organization based on behavior indices generated based on physical quantities measured by the at least one sensor of a plurality of terminals worn on the first person and the similar member.

14. The sensor data analysis system according to claim 3, wherein the analysis unit is configured to:
generate a frequency distribution of durations of body moving states of all the plurality of persons based on the measurement results of the acceleration sensors of all the plurality of terminals worn on the plurality of persons belonging to the organization; and
calculate the index relating to the activated state of the organization based on the frequency distribution.

15. A sensor data analysis method, which is executed by a sensor data analysis system,
the sensor data analysis system comprising:
a plurality of terminals;
a control unit;
an analysis unit; and
a storage unit, wherein:
the plurality of terminals are each worn on each of a plurality of persons belonging to an organization, the plurality of terminals each comprising at least one sensor configured to measure a physical quantity;
the storage unit is configured to:
hold an index relating to an activated state of the organization; and
hold, for each of a plurality of first conditions relating to a behavior of each of the plurality of persons, a piece of advice corresponding to a statistical relation between an amount of the behavior satisfying the each of the plurality of first conditions and the index relating to the activated state of the organization;
the sensor data analysis method comprising:
generating, by the control unit, a behavior index for indicating a behavior of a first person among the plurality of persons based on the physical quantity measured by the at least one sensor of one of the plurality of terminals worn on the first person wherein the behavior index includes for the first person, one or more of an office arrival time, an office leaving time, a total conversation time per day, or a total desk work time per day;
calculating, by the analysis unit, for each of the plurality of first conditions, the statistical relation between the amount of the behavior satisfying the each of the plurality of first conditions and the index relating to the activated state of the organization based on the behavior index; and
outputting, by the control unit, a piece of advice corresponding to the statistical relation satisfying a second condition.

* * * * *